United States Patent
Padubidri et al.

(10) Patent No.: US 11,625,231 B2
(45) Date of Patent: Apr. 11, 2023

(54) CONTROLLING DEPLOYMENT OF SOFTWARE APPLICATIONS BASED ON EVALUATING DEPENDENCIES OF THE SOFTWARE APPLICATIONS

(71) Applicant: Dell Products L.P., Round Rock, TX (US)

(72) Inventors: Subramanya Padubidri, Bangalore (IN); Vinay Kumar Mahadevappa, Mysore (IN); Chethan Kumar, Shimoga (IN); Deepa Muthusamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/379,259

(22) Filed: Jul. 19, 2021

(65) Prior Publication Data
US 2022/0391189 A1    Dec. 8, 2022

(30) Foreign Application Priority Data

Jun. 4, 2021   (IN) .............................. 202141024942

(51) Int. Cl.
*G06F 8/65*      (2018.01)
*G06F 8/71*      (2018.01)

(52) U.S. Cl.
CPC . *G06F 8/65* (2013.01); *G06F 8/71* (2013.01)

(58) Field of Classification Search
CPC ...................................... G06F 8/71; G06F 8/65
See application file for complete search history.

(56) References Cited

U.S. PATENT DOCUMENTS

| 9,430,229 B1 * | 8/2016 | Van Zijst | G06F 9/3844 |
| 10,871,957 B2 * | 12/2020 | Ryall | G06F 8/65 |
| 2016/0188325 A1 * | 6/2016 | Blitzstein | H04L 65/403 |
| | | | 717/101 |
| 2018/0011750 A1 * | 1/2018 | Maiorano Quiroga | G06F 9/52 |

(Continued)

OTHER PUBLICATIONS

Gitlab, "GitLab is the open DevOps platform," https://about.gitlab.com, Accessed Jun. 18, 2021, 14 pages.

(Continued)

*Primary Examiner* — Lewis A Bullock, Jr.
*Assistant Examiner* — Theodore E Hebert
(74) *Attorney, Agent, or Firm* — Ryan, Mason & Lewis, LLP

(57) ABSTRACT

An apparatus comprises a processing device configured to monitor development of a plurality of software applications, to identify a first one of the plurality of software applications that has a given version ready for deployment to a production environment of an information technology infrastructure, and to determine at least one dependency between the given version of the first one of the plurality of software applications and a given version of at least a second one of the plurality of software applications. The processing device is further configured to control deployment of the given version of the first one of the plurality of software applications in the production environment of the information technology infrastructure based at least in part on evaluating a deployment status of the given version of the second one of the plurality of software applications.

20 Claims, 19 Drawing Sheets

(56) References Cited

U.S. PATENT DOCUMENTS

| | | | |
|---|---|---|---|
| 2018/0088929 A1* | 3/2018 | Eberlein | G06F 8/65 |
| 2018/0210622 A1* | 7/2018 | Back | G06F 8/34 |
| 2019/0163478 A1* | 5/2019 | Cimadamore | G06F 9/3861 |
| 2019/0278691 A1* | 9/2019 | Ramalingam | G06F 8/71 |
| 2020/0004528 A1* | 1/2020 | Pape | G06F 8/65 |
| 2020/0050431 A1* | 2/2020 | Zilouchian Moghaddam | G06F 8/38 |
| 2021/0089297 A1* | 3/2021 | Duvall | G06F 8/30 |
| 2022/0091838 A1* | 3/2022 | Lee | G06F 8/433 |

OTHER PUBLICATIONS

M. Brown et al., "Operations Guidance for Team Foundation Server," https://docs.microsoft.com/en-us/previous-versions/bb663036(v=vs.80)?redirectedfrom=MSDN, Feb. 25, 2008, 23 pages.

Atlassian, "Jira Software," https://www.atlassian.com/software/jira, Accessed Jun. 18, 2021, 12 pages.

Github, "Where the World Builds Software," https://github.com, Accessed Jun. 18, 2021, 16 pages.

\* cited by examiner

FIG. 8G

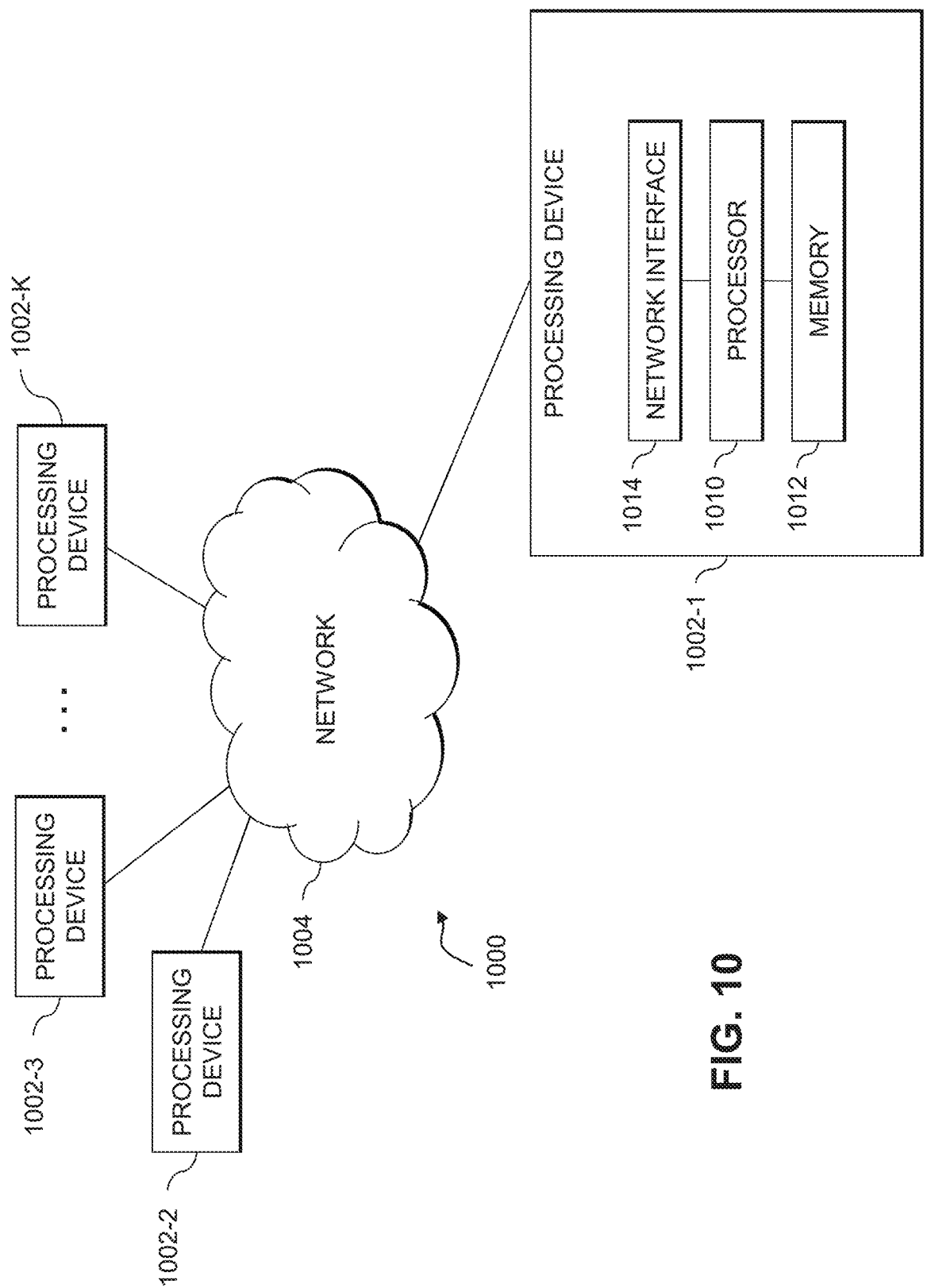

CONTROLLING DEPLOYMENT OF SOFTWARE APPLICATIONS BASED ON EVALUATING DEPENDENCIES OF THE SOFTWARE APPLICATIONS

FIELD

The field relates generally to information processing, and more particularly to techniques for managing software applications.

BACKGROUND

Software applications installed on computing resources may be periodically updated by software vendors or other providers of the software applications. When a software update is made available for a software application installed on a particular computing resource, a software update notification may be provided on that computing resource indicating the software application to be updated. The software update notification may also include various user interface features for controlling how and whether to apply the software update. Such user interface features may include, for example, selectable buttons allowing a user to continue with applying the software update or to defer application of the software update.

SUMMARY

Illustrative embodiments of the present invention provide techniques for controlling deployment of software applications based on evaluating dependencies of the software applications.

In one embodiment, an apparatus comprises at least one processing device comprising a processor coupled to a memory. The at least one processing device is configured to perform the steps of monitoring development of a plurality of software applications and identifying, based at least in part on the monitoring, a first one of the plurality of software applications that has a given version ready for deployment to a production environment of an information technology infrastructure. The at least one processing device is also configured to perform the step of determining, based at least in part on the monitoring, at least one dependency between the given version of the first one of the plurality of software applications and a given version of at least a second one of the plurality of software applications. The at least one processing device is further configured to perform the steps of evaluating a deployment status of the given version of the second one of the plurality of software applications and controlling deployment of the given version of the first one of the plurality of software applications in the production environment of the information technology infrastructure based at least in part on the evaluated deployment status of the given version of the second one of the plurality of software applications.

These and other illustrative embodiments include, without limitation, methods, apparatus, networks, systems and processor-readable storage media.

BRIEF DESCRIPTION OF THE DRAWINGS

FIGS. 8A-8H show application of the FIGS. 7A-7C process flow for two dependent applications in an illustrative embodiment.

FIGS. 9 and 10 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
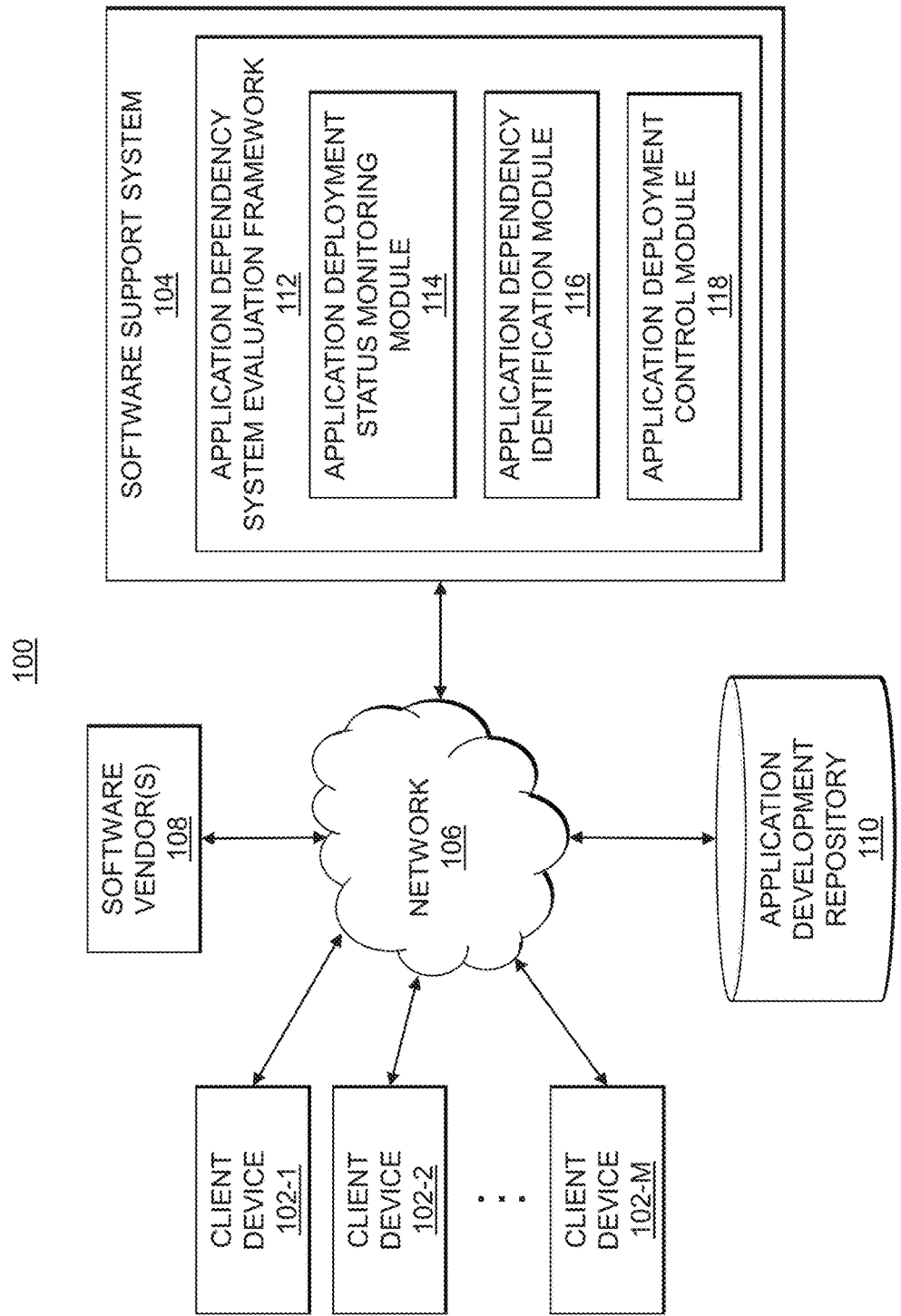
FIG. 1 is a block diagram of an information processing system configured for controlling deployment of software applications based on evaluating dependencies of the software applications in an illustrative embodiment of the invention.

FIG. 1 shows an information processing system 100 configured in accordance with an illustrative embodiment. The information processing system 100 is assumed to be built on at least one processing platform and provides functionality for controlling deployment of software applications based on evaluating dependencies of the software applications. The information processing system 100 includes a set of client devices 102-1, 102-2, . . . 102-M (collectively, client devices 102) that are coupled to a software support system 104 via a network 106. Also coupled to the network 106 is one or more software vendors 108 and an application development repository 110.

The software support system 104 implements an application dependency system evaluation framework 112 that is configured for intelligent deployment of software applications to a production environment. In some embodiments, the client devices 102 represent such a production environment. In other embodiments, the client devices 102 may be utilized by software developers (e.g., of one or more of the software vendors 108), and the software developers utilize the client devices 102 to access the application dependency system evaluation framework 112 of the software support system 104 during software development processes (e.g., continuous integration continuous deployment (CICD) software development processes). In still other embodiments, a subset of the client devices 102 are utilized by software developers while another possibly distinct subset of the client devices 102 represent a production environment for the software applications.

Where the client devices 102 are part of the production environment, the client devices 102 may have various software applications installed where new versions of such software applications may be deployed using the intelligence provided by the application dependency system evaluation framework 112 of the software support system 104. The software applications may include operating systems (OSes) of the client devices 102, or at least a portion thereof. The software applications may also or alternatively include other types of software applications or programs that are installed or run within the OSes of the client devices 102. The software applications may also or alternatively include applications that run in accordance with a client-server computer program architecture, such as web applications designed for delivery to users of the client devices 102 over the network 106 (e.g., from application servers, etc.). Web applications are an example of applications that run in accordance with a client-server computer program architecture.

A software application may also be or include one or more microservices. In a microservice architecture, a single application is developed as a suite of small microservices. A microservice can run on its own process and communicate with other systems or services through a lightweight mechanism, such as a hypertext transport protocol (HTTP) resource application programming interface (API) or communication API provided by an external system. Microservices in some embodiments are assumed to be independently deployable using fully automated deployment mechanisms. In some embodiments, microservices are small, independent and composable services that can be accessed through Representational State Transfer (RESTful) APIs. Thus, a single monolithic application may be broken down into separate and independent microservices for discrete functions, providing potential benefits in innovation, manageability, resiliency and scalability. A microservices architecture enables individual microservices to be deployed and scaled independently, such as via software containers. Individual microservices can be worked on in parallel by different teams, may be built in different programming languages, and have continuous delivery and deployment flows. As development moves toward cloud-native approaches, it may be desired to decompose, disintegrate or otherwise separate existing monolithic applications into microservices. Advantageously, microservices allow software developers of an enterprise to work independently and communicate together. Thus, an enterprise system can achieve better efficiency and resiliency with microservices as compared with monolithic applications, while providing similar or better results. The use of microservices, however, can increase the complexity of tracking work items and dependencies and coordinating rollout of interdependent microservices.

It should therefore be appreciated that the term "software application" as used herein is intended to be broadly construed to include the aforementioned and other types of software applications, as well as combinations of the aforementioned types of software applications.

The client devices 102 may comprise respective compute resources, which may include physical and virtual computing resources of an information technology (IT) infrastructure. Physical computing resources may include physical hardware such as servers, storage systems, networking equipment, Internet of Things (IoT) devices, other types of processing and computing devices, etc. Virtual computing resources may include virtual machines (VMs), software containers, etc.

In some embodiments, client devices 102 are assumed to comprise physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, software containers, etc.

The client devices 102 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The software vendors 108, which may also be referred to herein as software providers, are assumed to be the source of the software applications installed on the client devices 102. Each of the software vendors 108 is assumed to comprise or be associated with a software development and deployment cycle, such as a CICD software development cycle. The software vendors 108 may include vendor-side agents configured to provide software updates to the client devices 102 utilizing client-side agents implemented on the client devices 102. For example, the vendor-side agents of the software vendors 108 may communicate with the application dependency system evaluation framework 112 of the software support system 104 to determine whether a particular software application can be deployed to production (e.g., provided from the software vendors 108 to the client devices 102 utilizing the vendor-side and client-side agents).

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

One or more of the client devices 102, the software support system 104 (or components thereof, such as the application dependency system evaluation framework 112) and software vendors 108 may store various information regarding installed software applications and their usage, change information for software updates, dependencies between applications, etc. in the application development repository 110. The application development repository 110 may be implemented using one or more storage systems or devices associated with the client devices 102, the software support system 104 and/or the software vendors 108. In some embodiments, one or more of such storage systems may comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the client devices 102, the software support system 104 (or components thereof, such as the application dependency system evaluation framework 112), and/or the software vendors 108, as well as to support communication between the client devices 102, the software support system 104, the software vendors 108 and other related systems and devices not explicitly shown.

The software applications installed on the client devices 102 are assumed to be utilized by various different users. The term "user" herein is intended to be broadly construed so as to encompass numerous arrangements of human, hardware, software or firmware entities, as well as combinations of such entities.

In some embodiments, software update alerts or notifications generated by the software support system 104 are provided to users of the client devices 102, to system administrators, to IT managers or other authorized personnel of a production environment, to the software vendors 108, to combinations thereof, etc., via one or more host agents. Such host agents may be implemented via the client devices 102 or by other computing or processing devices associated with system administrators, IT managers or other authorized personnel that manage the client devices 102 in the production environment, the software vendors 108, combinations thereof, etc. Such devices can illustratively comprise mobile telephones, laptop computers, tablet computers, desktop computers, or other types of computers or processing devices configured for communication over network 106 with the client devices 102. For example, a given host agent may comprise a mobile telephone equipped with a mobile application configured to receive alerts or notifications from the software support system 104 (e.g., when new software updates are available and ready for deployment to a production environment). The given host agent provides an interface for responding to such various alerts or notifications, such as by selecting whether to deploy the software updates, as described elsewhere herein.

It should be noted that a "host agent" as this term is generally used herein may comprise an automated entity, such as a software entity running on a processing device. Accordingly, a host agent need not be a human entity.

The client devices 102, software support system 104 and software vendors 108 in the FIG. 1 embodiment are assumed to be implemented using at least one processing device. Each such processing device generally comprises at least one processor and an associated memory, and implements one or more functional modules for controlling certain features of the client devices 102 (e.g., client-side agents), the software vendors 108 (e.g., vendor-side agents) and the software support system 104 (e.g., the application dependency system evaluation framework 112).

In the FIG. 1 embodiment, the application dependency system evaluation framework 112 comprises an application deployment status monitoring module 114, an application dependency identification module 116 and an application deployment control module 118. The application deployment status monitoring module 114 is configured to monitor for new builds or other versions of software that are to be deployed in a production environment (e.g., including one or more of the client devices 102). This may involve interacting with vendor-side agents on the software vendors 108. The application dependency identification module 116 is configured to identify whether a given software application that is ready for deployment to a production environment has any dependencies with other software applications. If so, the application deployment control module 118 determines whether the given software application can be deployed to production based on its dependency status, the availability of feature toggling in the given software application, the other software applications that have dependencies with the given software application, combinations thereof, etc.

At least portions of such client-side agents, vendor-side agents, application dependency system evaluation framework 112 (e.g., the application deployment status monitoring module 114, the application dependency identification module 116 and the application deployment control module 118) and other components of the information processing system 100 may be implemented at least in part in the form of software that is stored in memory and executed by processors of such processing devices.

It is to be appreciated that the particular arrangement of the client devices 102, software support system 104, software vendors 108 and application development repository 110 illustrated in the FIG. 1 embodiment is presented by way of example only, and alternative arrangements can be used in other embodiments. For example, the application dependency system evaluation framework 112 may be implemented at least in part external to the software support system 104, such as on one or more of the client devices 102 and/or the software vendors 108. As another example, the functionality associated with the application deployment status monitoring module 114, the application dependency identification module 116 and the application deployment control module 118 may be combined into one module, or separated across more than three modules with the multiple modules possibly being implemented with multiple distinct processors or processing devices.

It is to be understood that the particular set of elements shown in FIG. 1 for controlling deployment of software applications based on evaluating dependencies of the software applications is presented by way of illustrative example only, and in other embodiments additional or alternative elements may be used. Thus, another embodiment may include additional or alternative systems, devices and other network entities, as well as different arrangements of modules and other components.

One or more of the client devices 102, the software support system 104 and/or the software vendors 108, in some embodiments, may be part of cloud infrastructure as will be described in further detail below.

The client devices 102, the software support system 104, the software vendors 108 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 102, the software support system 104, the software vendors 108, or components thereof, may be implemented on respective distinct processing platforms, although numerous other arrangements are possible. For example, in some embodiments at least portions of the client devices 102, the software support system 104 and the software vendors 108 are implemented on the same processing platform. A given client device (e.g., 102-1) can therefore be implemented at least in part within at least one processing platform that implements at least a portion of a given one of the software vendors 108 and/or the software support system 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the software support system 104 and the software vendors 108, or portions or components thereof, to reside in different data centers. Numerous other distributed implementations are possible. The client devices 102, the software support system 104 and the software vendors 108 can also be implemented in a distributed manner across multiple data centers.

Additional examples of processing platforms utilized to implement portions of the information process system 100 of FIG. 1 in illustrative embodiments will be described in more detail below in conjunction with FIGS. 9 and 10.

It is to be appreciated that these and other features of illustrative embodiments are presented by way of example only, and should not be construed as limiting in any way.

An exemplary process for controlling deployment of software applications based on evaluating dependencies of the software applications will now be described in more detail with reference to the flow diagram of FIG. 2. It is to be understood that this particular process is only an example, and that additional or alternative processes for controlling deployment of software applications based on evaluating dependencies of the software applications can be carried out in other embodiments.

In this embodiment, the process includes steps 200 through 208. These steps are assumed to be performed at least in part by the application dependency system evaluation framework 112 of the software support system 104 utilizing the application deployment status monitoring module 114, the application dependency identification module 116 and the application deployment control module 118. The process begins with step 200, monitoring development of a plurality of software applications. The plurality of software applications may be developed by different software vendors or different organizations. Step 200 may include tracking a plurality of work items, where each of the plurality of work items is associated with development of at least one version of at least one of the plurality of software applications. Step 200 may further include building a dependency graph, the dependency graph comprising nodes representing the plurality of work items and edges connecting the nodes representing dependency relationships between the plurality of work items. At least a subset of the edges connect work items associated with different ones of the plurality of software applications. Step 200 may include analyzing one or more source code repositories utilized by the plurality of software applications to identify commits of software code in two or more branches of one or more branching models utilized by the one or more source code repositories.

Figure 2:
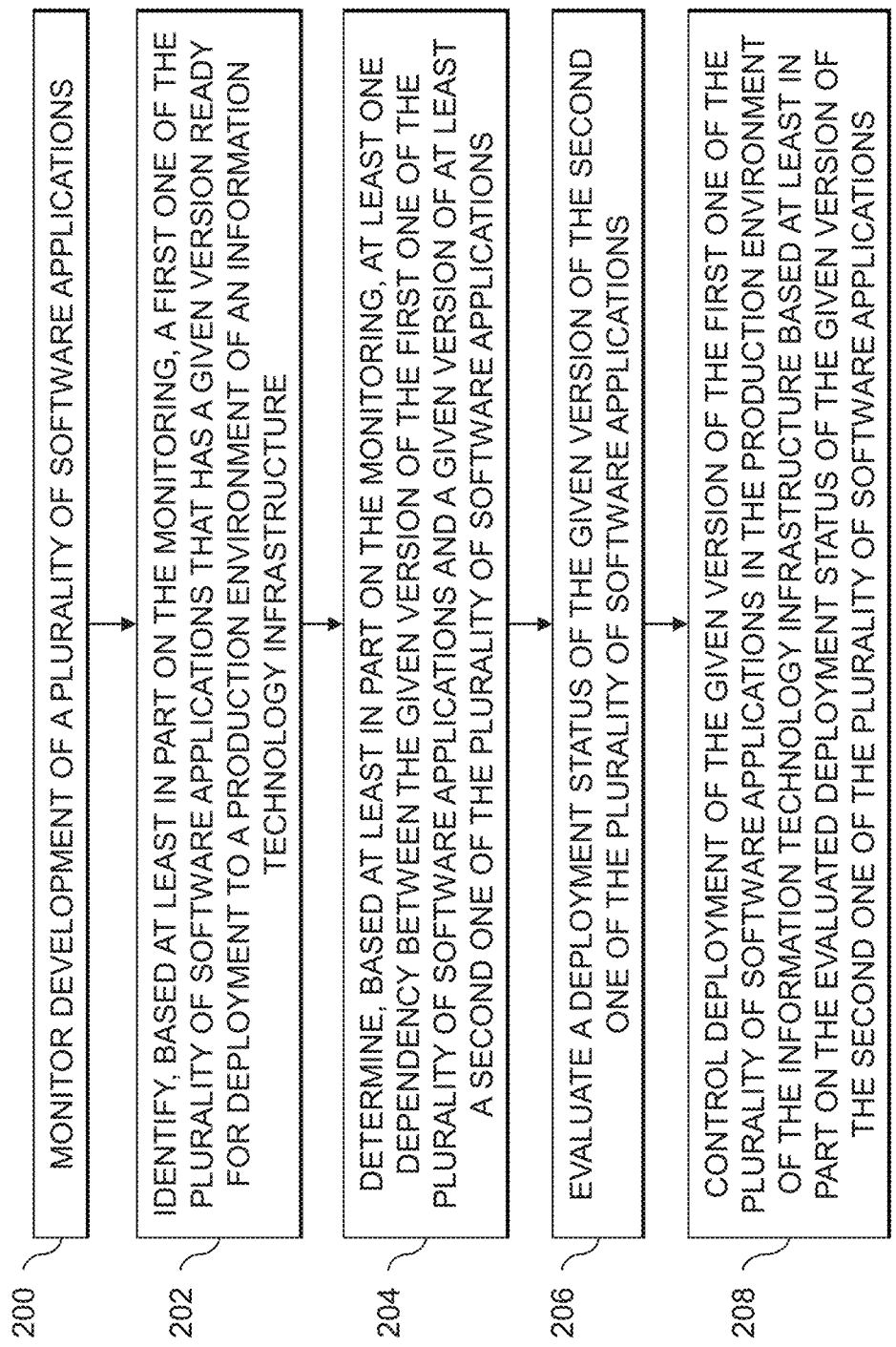
FIG. 2 is a flow diagram of an exemplary process for controlling deployment of software applications based on evaluating dependencies of the software applications in an illustrative embodiment.

The FIG. 2 process continues with step 202, identifying, based at least in part on the monitoring in step 200, a first one of the plurality of software applications that has a given version ready for deployment to a production environment of an IT infrastructure. The IT infrastructure may be associated with a particular organization, enterprise or other entity. For example, the IT infrastructure may comprise a data center or customer site of a given organization, enterprise or other entity. In step 204, at least one dependency between the given version of the first one of the plurality of software applications and a given version of at least a second one of the plurality of software applications is determined based at least in part on the monitoring in step 200. A deployment status of the given version of the second one of the plurality of software applications in the IT infrastructure is evaluated in step 206, and deployment of the given version of the first one of the plurality of software applications in the production environment of the IT infrastructure is controlled in step 208 based at least in part on the evaluated deployment status of the given version of the second one of the plurality of software applications.

Step 206 may include determining whether the given version of the second one of the plurality of software applications has been deployed to the production environment of the IT infrastructure. Step 208 may comprise, responsive to determining that the given version of the second one of the plurality of software applications has been deployed to the production environment of the IT infrastructure, allowing deployment of the given version of the first one of the plurality of software applications in the production environment of the IT infrastructure. Step 208 may further comprise, responsive to determining that the given version of the second one of the plurality of software applications has not been deployed to the production environment of the IT infrastructure, identifying one or more features of the given version of the first one of the plurality of software applications that have dependencies with the given version of the second one of the plurality of software applications and determining whether the given version of the first one of the plurality of software applications has available feature toggles for the identified one or more features.

Responsive to determining that the given version of the first one of the plurality of software applications has available feature toggles for the identified one or more features, step 208 may include utilizing the available feature toggles to disable the identified one or more features and allowing deployment of the given version of the first one of the plurality of software applications in the production environment of the IT infrastructure with the identified one or more features disabled. If as a result of subsequent monitoring in step 200 it is determined that the given version of the second one of the plurality of software applications has been deployed in the production environment of the IT infrastructure subsequent to deployment of the given version of the first one of the plurality of software applications in the production environment of the IT infrastructure with the identified one or more features disabled, the available feature toggles may be used to enable the identified one or more features in the given version of the first one of the plurality of software applications.

Responsive to determining that the given version of the first one of the plurality of software applications does not have available feature toggles for the identified one or more features, step 208 may include blocking deployment of the given version of the first one of the plurality of software applications in the production environment of the IT infrastructure. If, subsequent to blocking the deployment of the given version of the first one of the plurality of software applications in the production environment of the IT infrastructure it is determined that the given version of the second one of the plurality of software applications has been deployed in the production environment of the IT infrastructure, step 208 may include allowing deployment of the given version of the first one of the plurality of software applications in the production environment of the IT infrastructure.

In an organization that deploys multiple software applications, production issues may occur as a result of sequencing of work across the different software applications that have been deployed for that organization (e.g., in a particular enterprise system, data center, set of VMs, compute clouds, etc.). Such issues are common when there are dependencies between systems and software applications must align their deployments. Such problems can also occur when there are integrations internal and external to a particular organization, including where software applications from multiple software vendors are deployed in a single organization and there are dependencies between such software applications. Some software applications, including software applications designed for operation in the cloud, may be associated with CICD software development processes. When CICD is enabled but there is a lack of clarity as to dependencies between software applications, this can lead to production issues.

Conventional approaches for tracking work items and tracking different software developers or teams of software developers rely on difficult, time-consuming and error prone manual work. Various application lifecycle management products, such as Microsoft® Team Foundation Server (TFS), Jira®, etc., may be used for tracking work items and dependencies. There is a need, however, for solutions that automate the entire flow, from code commit to production deployment, across software applications by tracking code and work item dependencies. As noted above, conventional approaches may rely on individual software developers, program managers and potentially users in other roles to coordinate updated states of each work item and to track their associated dependencies. If there are any manual errors, this can lead to undesirable production issues. Sequencing issues can be costly to remedy, including requiring rolling back the entire code of software applications from production.

Illustrative embodiments provide an intelligent framework (e.g., the application dependency system evaluation framework 112), which integrates work items and source code status from different applications and creates an ecosystem which provides clarity on dependencies and sequencing of work items across one or more organizations. The intelligent framework can advantageously automatically stop any build from being deployed to production if it does not match certain criteria based on dependency system evaluation. For example, if source code is on GitLab, a team is following certain automated software development and IT operations (DevOps) processes, and TFS is being used for work item or story management, the intelligent framework can update the status of work items automatically based on a CICD pipeline and tie that status to the work item and its dependencies. This enables the intelligent framework to track the changes for any dependency system, and also enables intelligence to stop any changes going to production without having its dependency changes deployed. This will also allow applications to deploy independently and rely on feature toggles for ensuring consistency (e.g., through automatic feature toggle updates based on dependency application work item status).

In any enterprise or other software application, tracking work items which have dependencies on other applications is a major manual task, which can lead to various mistakes and production issues. Conventional software lifecycle management products are limited, in that source code changes and work items may be tracked by different products, requiring manual work and leading to potential information gaps that can lead to inconsistencies and issues during deployment. Illustrative embodiments provide an intelligent framework to automate the tracking of work items and to control deployment of applications to production environments (e.g., by stopping deployment of applications to production environments unless their associated dependency systems are deployed in a proper sequence).

When software code (e.g., of an application) is pushed by any software development team member, if changes in the pushed software code depend on any other application for sequencing in an enterprise system, there is no automated way for tracking and stopping such changes from being deployed to a production environment if an associated dependency system is not ready or deployed. Conventional approaches rely on highly manual processes for tracking such dependencies, which are time-consuming, costly and error prone leading to issues in production environments when applications are deployed without having necessary changes from dependency systems also deployed.

Figure 3:
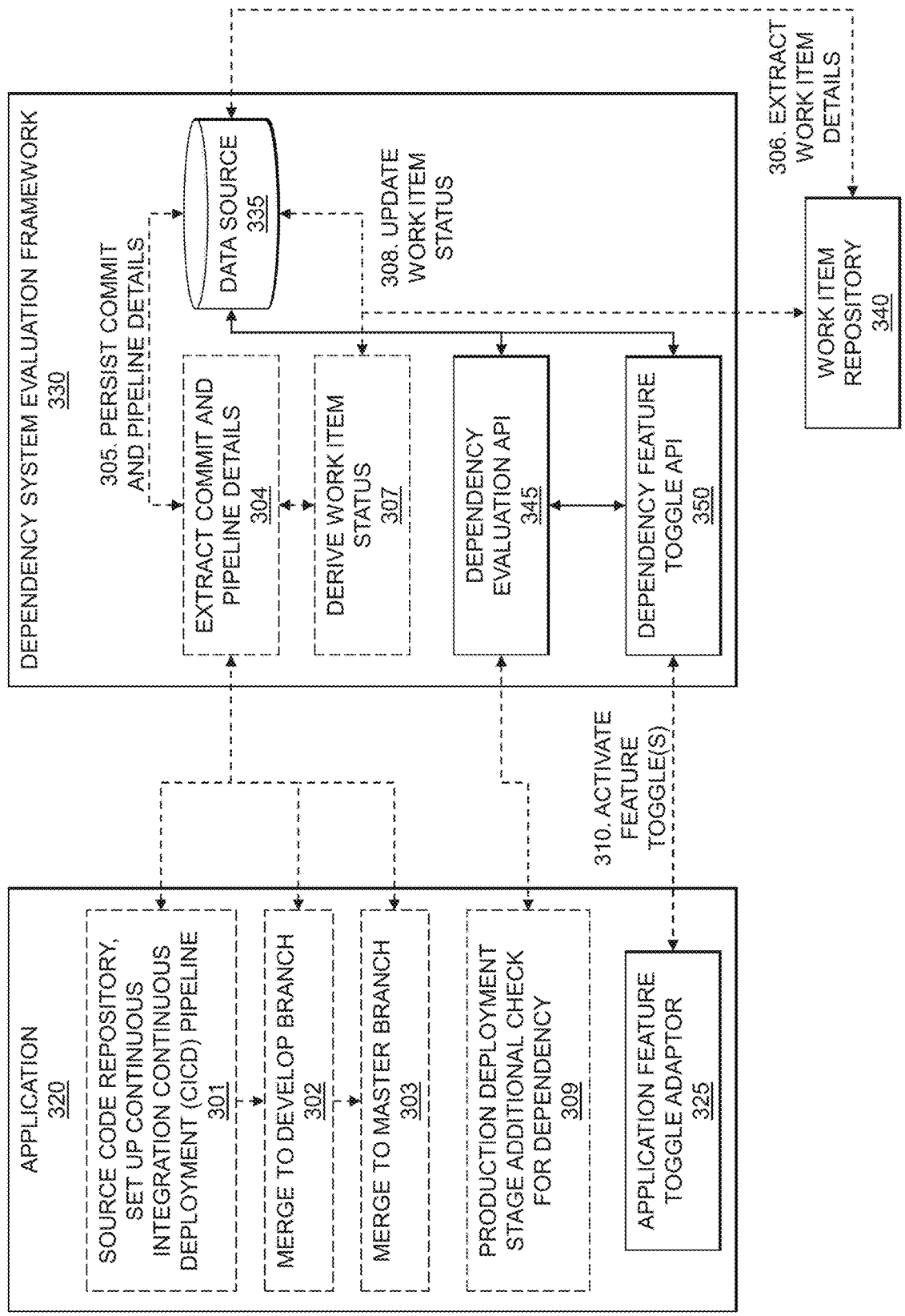
FIG. 3 shows a system flow for evaluating dependencies of an application prior to deployment in a production environment in an illustrative embodiment.

FIG. 3 illustrates a system flow for tracking dependencies of an application 320 using a dependency system evaluation framework (DSEF) 330 (e.g., an example implementation of the application dependency system evaluation framework 112 of FIG. 1). In the FIG. 3 system flow, a work item repository 340 is used to provide a tracking system where all work items are added and tracked for different applications (e.g., including the application 320 and various other applications not shown in FIG. 3 for clarity of illustration). In some embodiments, the work item repository 340 may make use of various software lifecycle management products (e.g., TFS, Jira®) for tracking work items. The application 320 is assumed to be associated with a source code repository (e.g., GitLab, GitHub, etc.). The DSEF 330 provides an intelligent adaptor which works between the work item tracking system (e.g., the work item repository 340) and the source code repository used by the application 320 to update work items and check whether builds of the application 320 are ready to be deployed into a production environment based on evaluating dependencies of the application 320.

The work item repository 340 will define a work item or story, along with acceptance criteria for that work item or story. As used herein, a "story" in software development refers to a natural language description of features of a particular software application. Each story may be associated with a set of acceptance criteria. The acceptance criteria for a given story defines requirements or conditions for fulfillment of the given story. If applicable, feature toggles are also defined on specified user-defined fields or as part of the acceptance criteria with a specific format (e.g., {"featuretoggle":"true/false"}). Dependent work items are then linked, to create a hierarchy of dependencies of the work items.

Source code management and CICD pipelines for the application 320 are set up with the source code repository in step 301. The application 320 in step 302 may be merged to a develop branch, and in step 303 may be merged to a master branch 303 prior to deployment in a production environment. Following one or more of the steps 301, 302 and 303, the DSEF 330 in step 304 extracts commit and pipeline details. The commit and pipeline details may then be persisted in a data source 335 (e.g., an example implementation of the application development repository 110) in step 305. The DSEF 330 in step 306 extracts work item details from the work item repository 340. In step 307, the DSEF derives work item status information, and then in step 308 updates the work item status in one or both of the data source 335 and the work item repository 340.

When the application 320 is in a production deployment stage in step 309, the application 320 will check for dependency information using a dependency evaluation API 345 of the DSEF 330. The dependency system evaluation API 345 is coupled to the data source 335, and can thus get the work item status for the application 320 to determine any dependencies with other applications. In step 310, a dependency feature toggle API 350 of the DSEF 330 can optionally activate feature toggles of the application 320 using application feature toggle adaptor 325. For example, if there is a dependency for the application 320 that is not ready for production deployment, the updated application 320 may still be deployed if the features of the application 320 that are changed and have the dependencies with other applications have feature toggling available.

A development team of the application 320 commits code with work item identifiers (IDs) and associated comments (e.g., story TFSID as comments when committing the code). This can be mandated on the source code repository for the application 320 with a specified pattern. The DSEF 330, as noted above, extracts the commit details (step 304) along with the comments and performs various actions including: persisting the commit details in the data source 335 (step 305); extracting the work item details from the work item repository 340 (step 306); deriving the work item status based on the CICD pipeline state (step 307); and automatically updating the work item status in the data source 335 and/or work item repository 340 (step 308).

Figure 4:
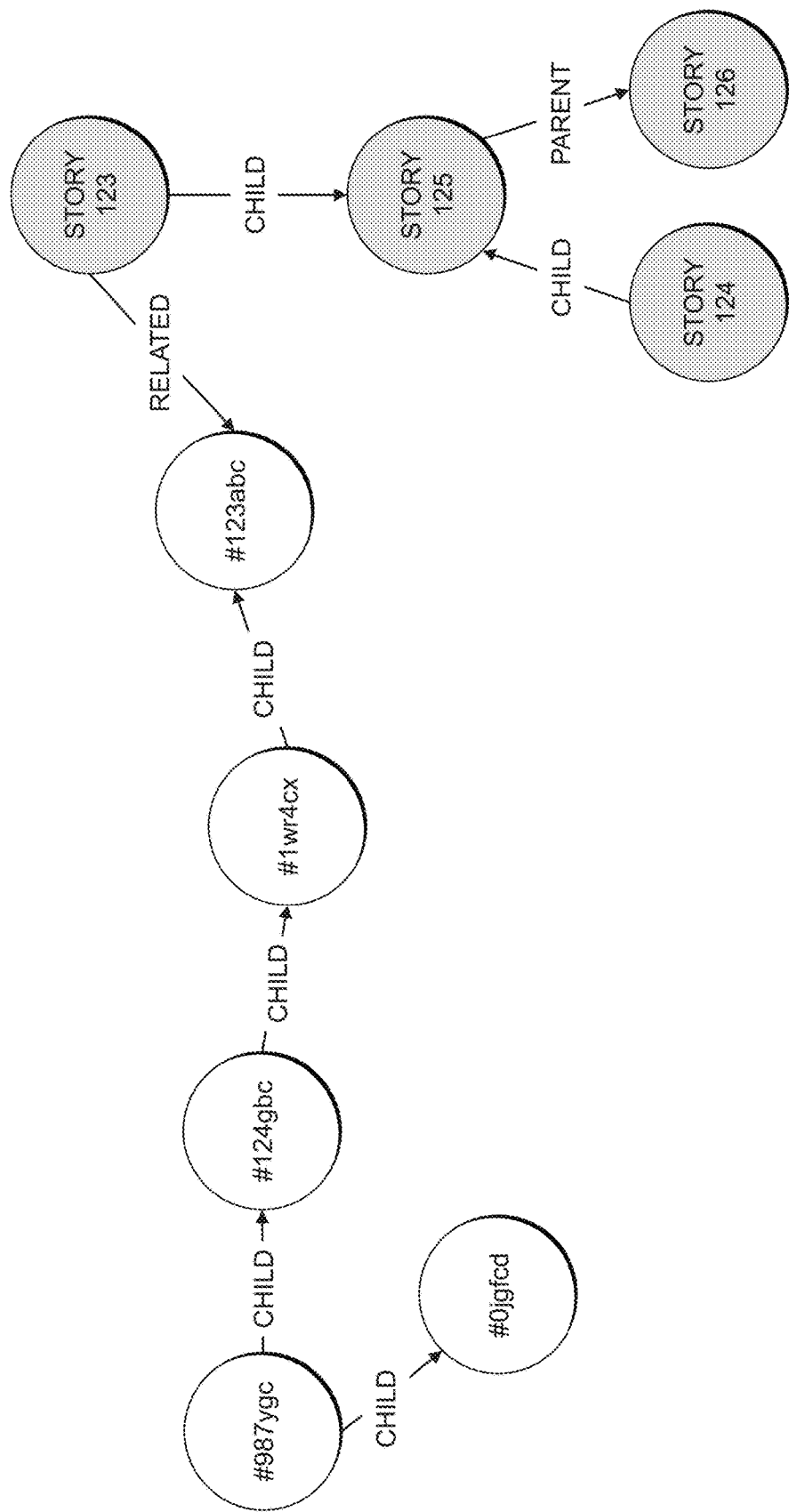
FIG. 4 shows a work item dependency graph in an illustrative embodiment.

The DSEF 330 exposes the dependency evaluation API 345 and dependency feature toggle API 350. The dependency evaluation API 345 derives whether a build of the application 320 can be deployed to production based on the dependency system status of the application 320 and available feature toggles. When a work item gets updated in the data source 335 (step 308), a dependency graph for the work item may be created. FIG. 4 shows an example of such a dependency graph 400. The dependency graph 400 includes parent/child relationships between "code" nodes (in white) representing code of different applications or work items, as well as parent/child relationships between "story" nodes (in gray) representing stories of different applications or work items. There are also relationships between code and story nodes as shown in FIG. 4 (e.g., between code node #123abc and story node story 123).

The dependency evaluation API 345 can parse through the dependency graph (e.g., dependency graph 400) to identify whether there are any open work items in the dependency system for the application 320 that is ready for deployment to a production environment. The evaluation process implemented by the dependency evaluation API 345 may include parsing through dependent work items and their status, and performing feature toggle checks using the dependency feature toggle API 350. The dependency feature toggle API 350 communicates with an application feature toggle adaptor 325 of the application 320 to see whether any feature toggles are defined. Feature toggles, if available, get updated based on the dependency work item status. If the application 320 does not define feature toggles for features that are affected by dependent work items, then the DSEF 330 will not let the build of the application 320 be deployed to a production environment. If the application 320 does define feature toggles for the features that are affected by the dependent work items, then the dependency feature toggle API 350 will enable the required feature toggles and the DSEF 330 will allow the build of the application to be deployed to the production environment.

The dependency evaluation API 345 of the DSEF 330 can further integrate with other production stage checks, such as additional checks on the CICD pipeline to parse the dependency system. If the dependency evaluation API 345 returns success, then the build of the application 320 will be allowed to deploy to the production environment. If the dependency evaluation API 345 returns failure, then the deployment to the production environment will be stopped.

Figure 5:
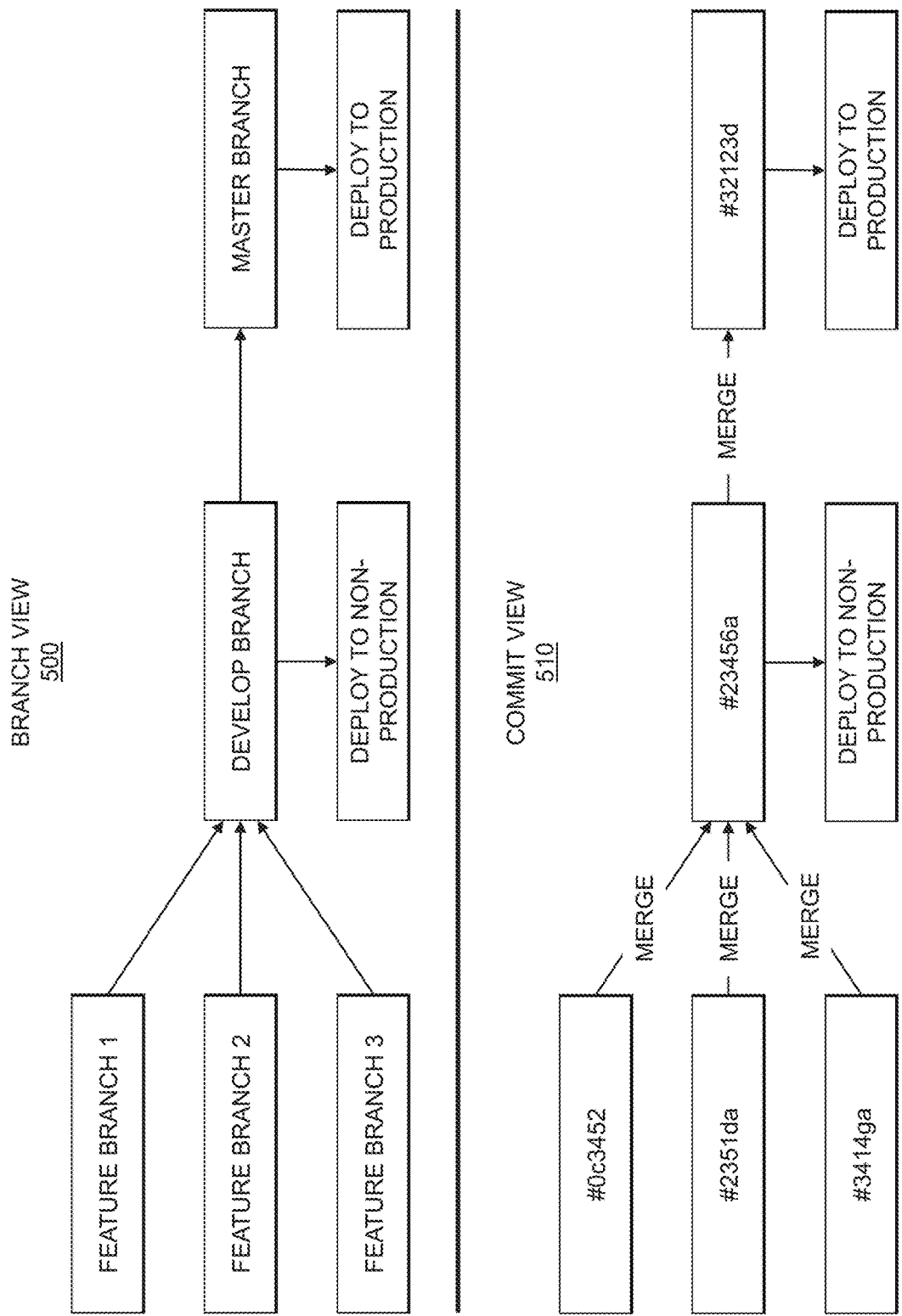
FIG. 5 shows branch and commit views of a software development process in an illustrative embodiment.

Additional details regarding deriving work item status (e.g., step 307 in the FIG. 3 system flow) will now be described. Changes from different branches may be merged to a master branch for production deployment. FIG. 5 shows a branch view 500, illustrating feature branches that are merged to a develop branch that is deployed to a non-production environment, and which are then merged to the master branch when ready for deployment to the production environment. FIG. 5 also shows a commit view 510 or tree. The commit tree can be obtained from the source code repository (e.g., GitHub). Using the commit tree, commits that have changes merged from different branches and that have been deployed to the non-production and production deployments can be identified.

Figure 6:
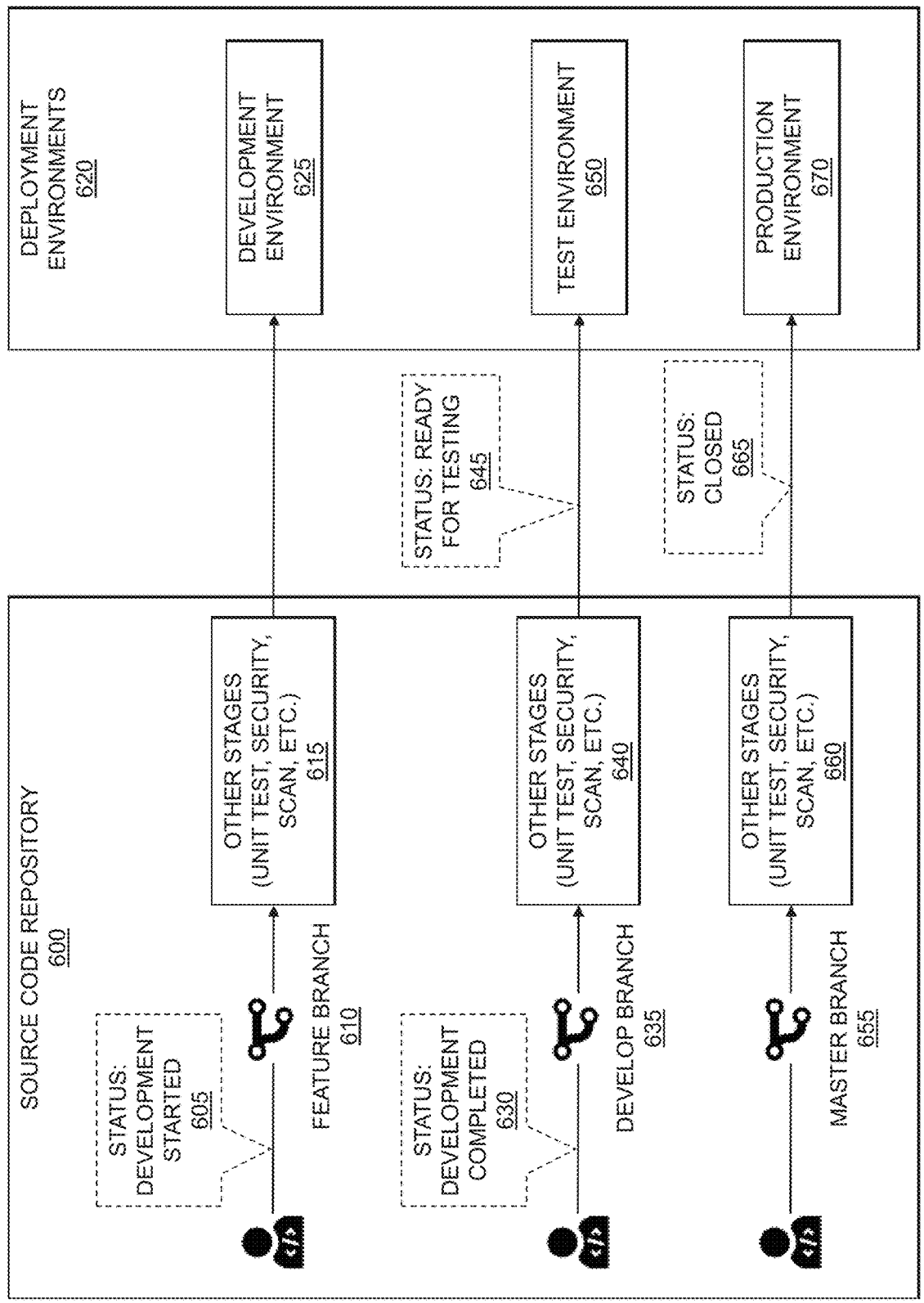
FIG. 6 shows work item status changes during an application lifecycle in an illustrative embodiment.

The work item status can then be derived from the feeds (e.g., the branch view 500 and commit view 510 of FIG. 5) generated by the source code repository. This status information is updated to the data source 335 of the DSEF 330 and to the work item repository 340. This is illustrated in FIG. 6, which shows a source code repository 600 and deployment environments 620 including a development environment 625, a test environment 650 and a production environment 670.

When a software development team pushes code to a feature branch 610, the status 605 will be development started. Following one or more other optional stages 615 (e.g., unit testing, security testing, scanning, etc.) the code will be pushed to the development environment 625. When the software development team merges the code to the develop branch 635, the status 630 will be development completed. Again following other optional stages 640 (e.g., unit testing, security testing, scanning, etc.), the status 645 is ready for testing and the code will be pushed to the test environment 650. When the code is merged to the master branch 655, and once again following other optional stages 660 (e.g., unit testing, security testing, scanning, etc.), the status 665 is closed and the code will be pushed to the production environment 670.

Figure 7A:
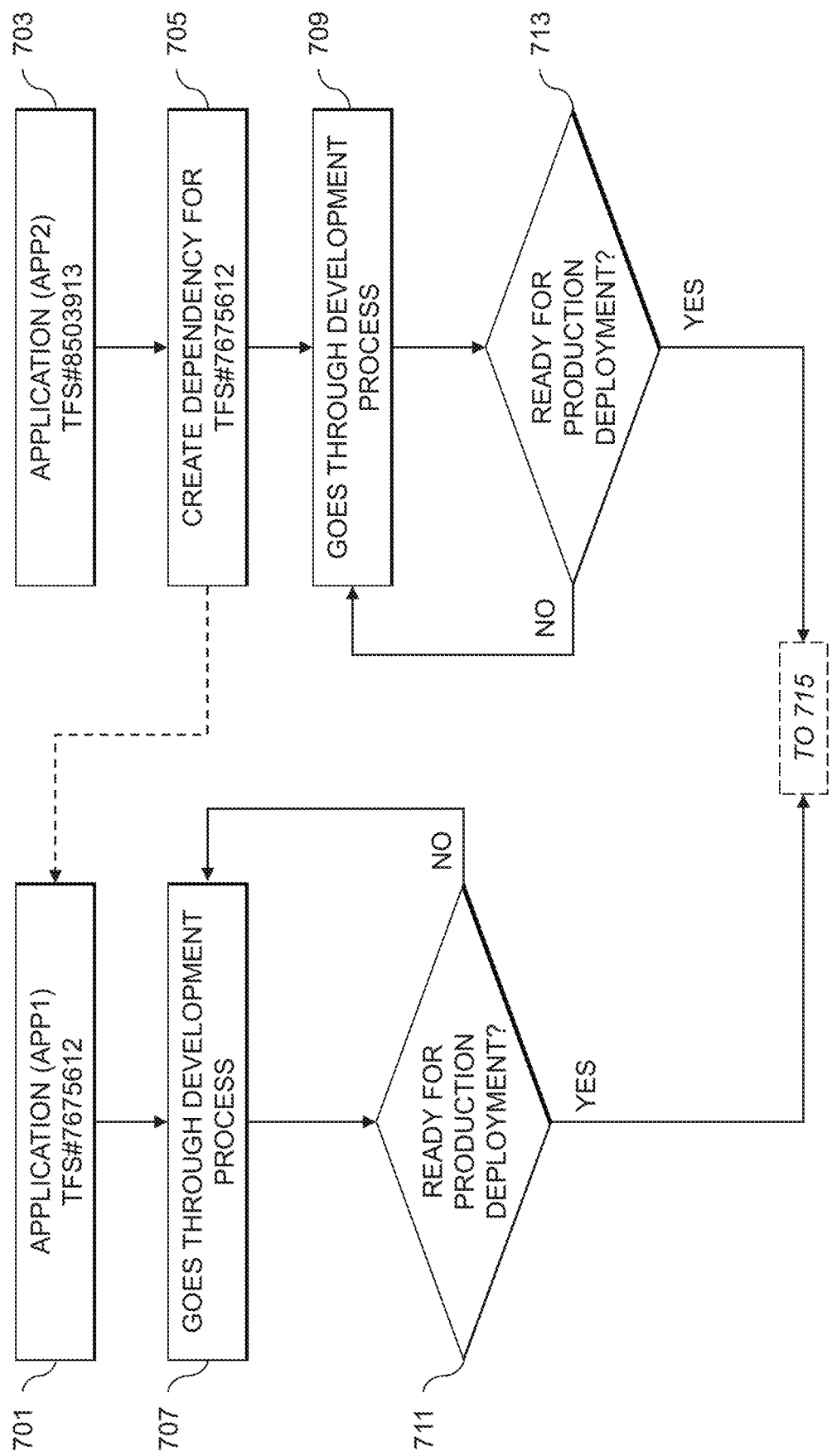
FIGS. 7A-7C show a process flow for evaluating dependency systems for applications in an illustrative embodiment.

A process flow for dependency evaluation performed by the dependency evaluation API 345 of the DSEF 330 will now be described with respect to FIGS. 7A-7C. The evaluation process performs checks to see whether applications may be safely deployed to a production environment based on their dependencies (e.g., based on dependency systems for the applications). As shown in FIG. 7A, there are two applications, APP1 (TFS #7675612) and APP2 (TFS #8503913). While in the example of FIGS. 7A-7C there are only two applications shown and described for clarity of illustration, it should be appreciated that more than two applications may be analyzed and that there may be dependencies among more than two applications.

In steps 701 and 703, the evaluation process is enabled on the individual application deployment pipelines for APP1 and APP2. APP2 has a dependency on APP1, and thus a dependency is created in step 705. APP1 and APP2 go through respective development processes in steps 707 and 709. In steps 711 and 713, determinations are made as to whether APP1 and APP2 are ready for application deployment. If the result of the step 711 or 713 determination is no, then that application will return to the development process in step 707 or 709. If the result of the step 711 or 713 determination is yes, the process flow proceeds to step 715.

Figure 7B:
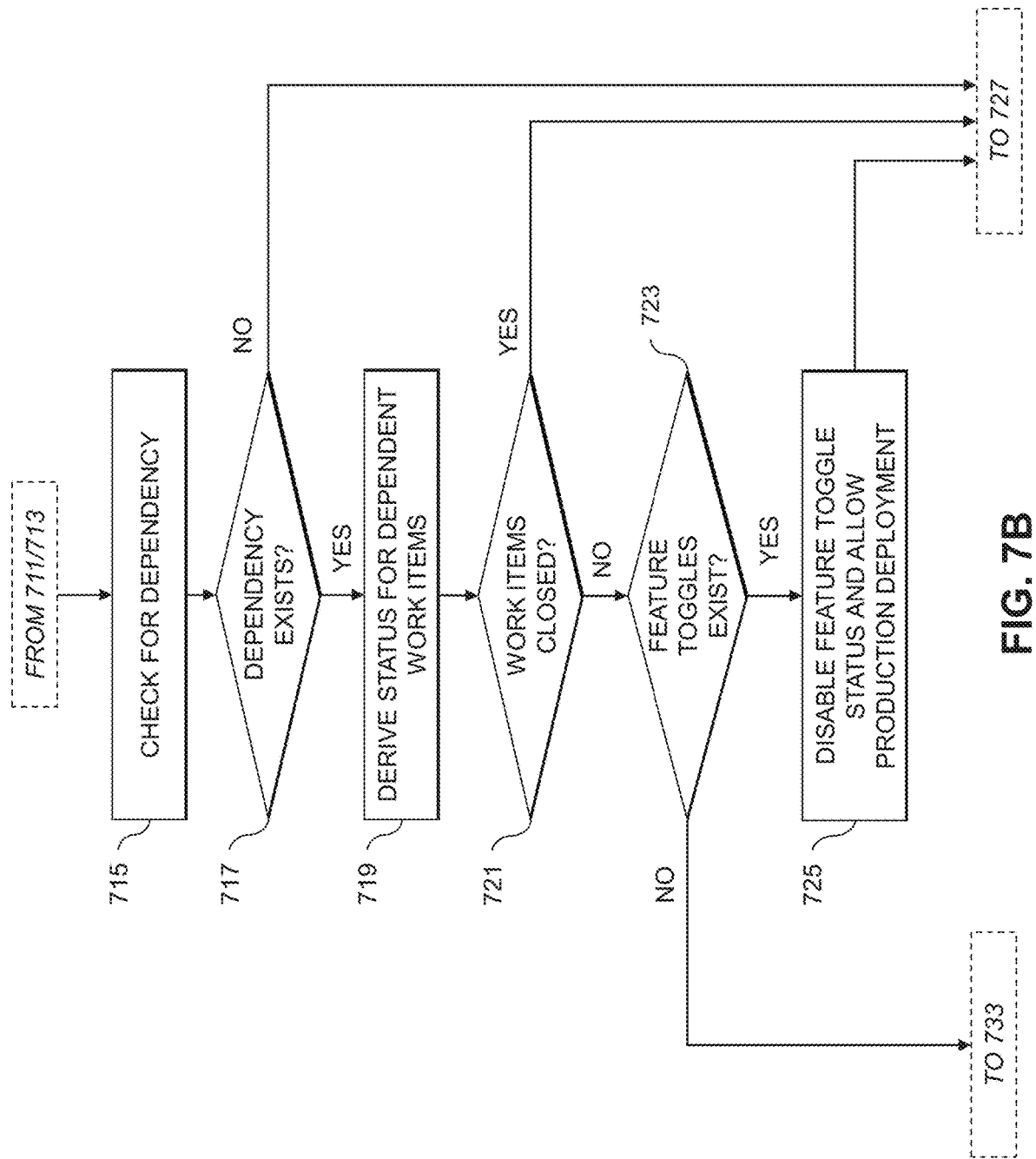

FIG. 7B illustrates steps 715 through 725, which may be entered following step 711 or step 713. The steps 715-725 may be performed for each application that is ready for production deployment (e.g., if the result of both the steps 711 and 713 determinations are yes then two iterations of steps 715-725 will be performed, one iteration for APP1 and one iteration for APP2). In step 715, a check is performed to see whether the application that is ready for deployment (e.g., APP1 if step 715 is performed following step 711, APP2 if step 715 is performed following step 713) has any dependencies. In step 717, a determination is made as to whether any dependency exists. If the result of the step 717 determination is no, the process flow proceeds to step 727 shown in FIG. 7C. If the result of the step 717 determination is yes, the process flow proceeds to step 719 where the status is derived for the dependent work items.

In step 721, a determination is made to whether all the work items from the dependent work items (identified in step 719) are closed. If the result of the step 721 determination is yes, the process flow proceeds to step 727 shown in FIG. 7C. If the result of the step 721 determination is no, the process flow proceeds to step 723. In step 723, a determination is made as to whether feature toggles are defined (for any work item which is going to be deployed to production, including for the unclosed work items) as defined on the story for that application (e.g., in step 701 for APP1, in step 703 for APP2). If the result of the step 723 determination is no (e.g., a feature toggle is not defined), the process flow proceeds to step 733 shown in FIG. 7C. If the result of the step 723 determination is yes (e.g., a feature toggle is defined), the process flow proceeds to step 725 where the feature toggle is updated or set to "disabled" and the application is allowed to enter production deployment. This ensures that even if the build is deployed to a production environment, the features related to the changes (having some dependency with unclosed work items) are not enabled in the production environment. The process flow, following step 725, proceeds to step 727 shown in FIG. 7C.

Figure 7C:
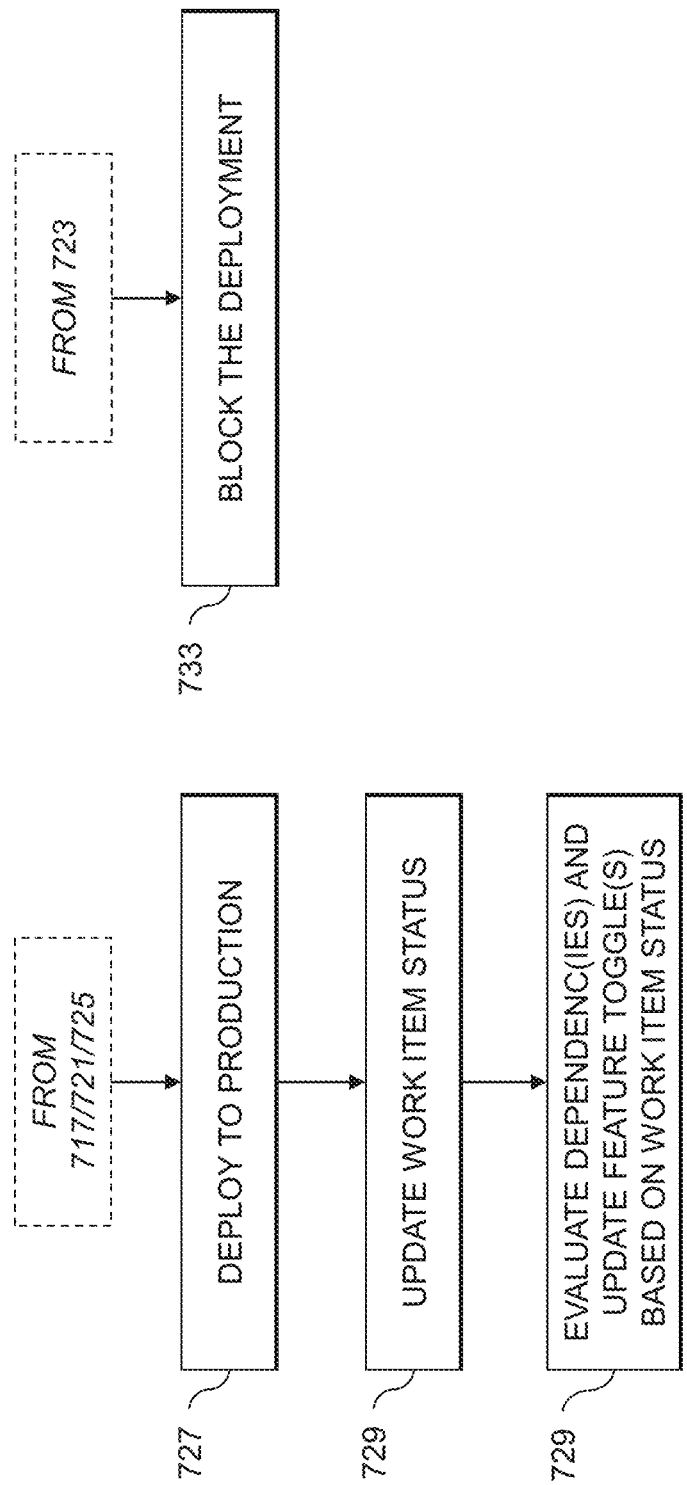

As shown in FIG. 7C, in step 727 the application is deployed to the production environment. In step 729, work item statuses for the deployed application are updated. After deployment, the dependent work items may be periodically evaluated in step 729 to determine whether any previously unclosed work items are now closed. If so, any associated feature toggles that were previously disabled because of such unclosed work items may have their status updated to enabled. As further shown in FIG. 7C, in step 733 the application is blocked from deployment to the production environment.

Dependency feature toggles used in illustrative embodiments provide a number of advantages. Unlike conventional application feature toggles, the dependency feature toggles are derived based on the dependency system and the deployment status of dependent work items. Applications (e.g., application 320) can invoke the dependency feature toggle API 350 of the dependency system evaluation framework 330 to derive the dependency feature toggles.

Figure 8A:
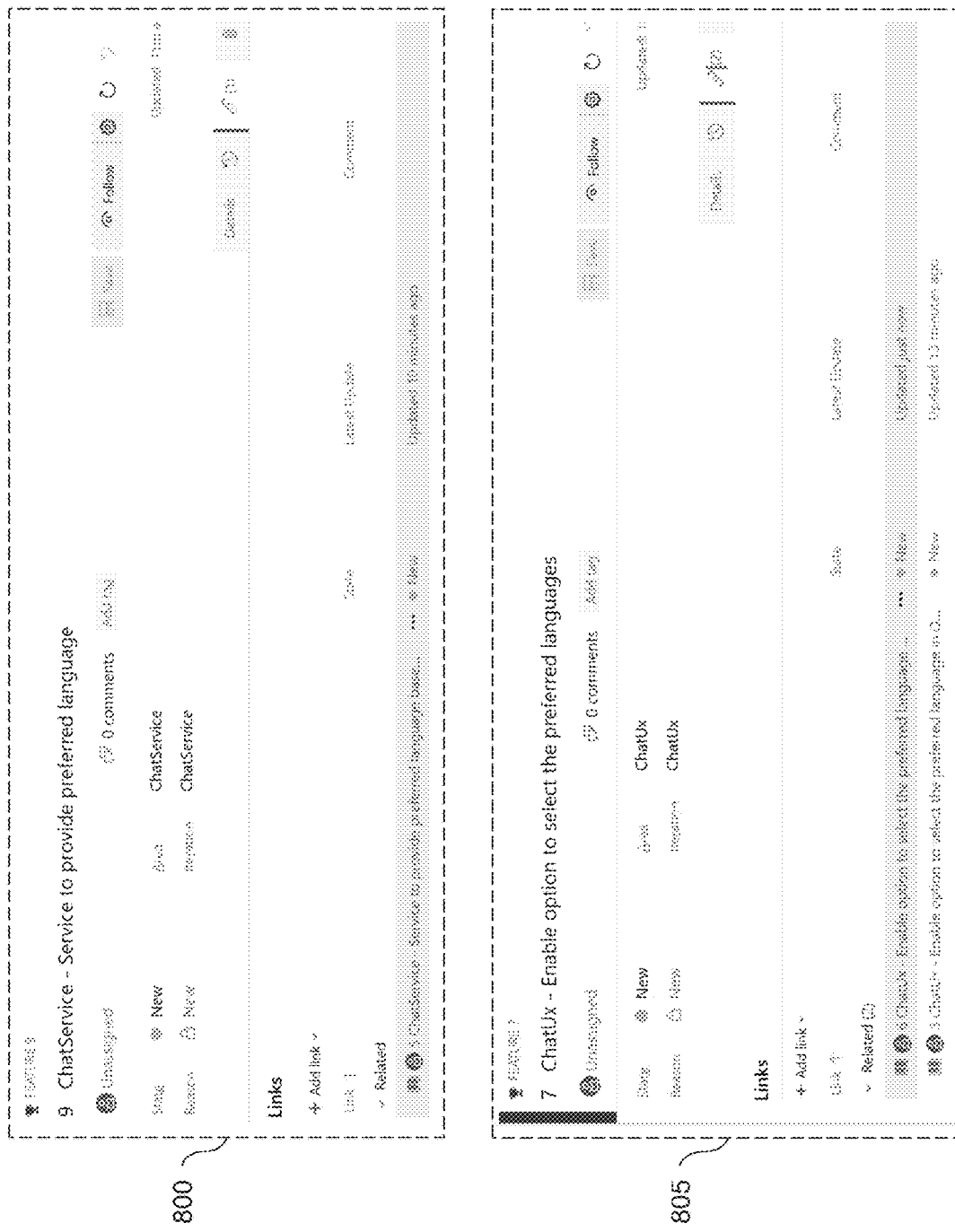
Figure 8B:
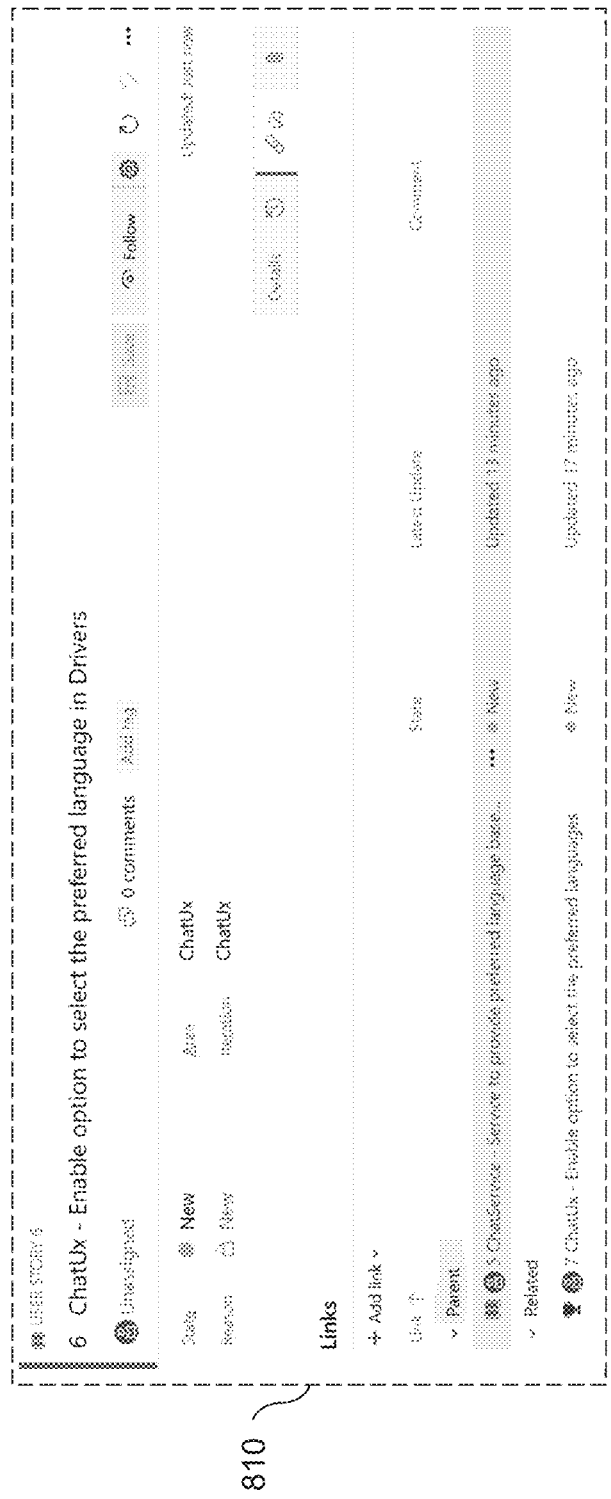
Figure 8C:
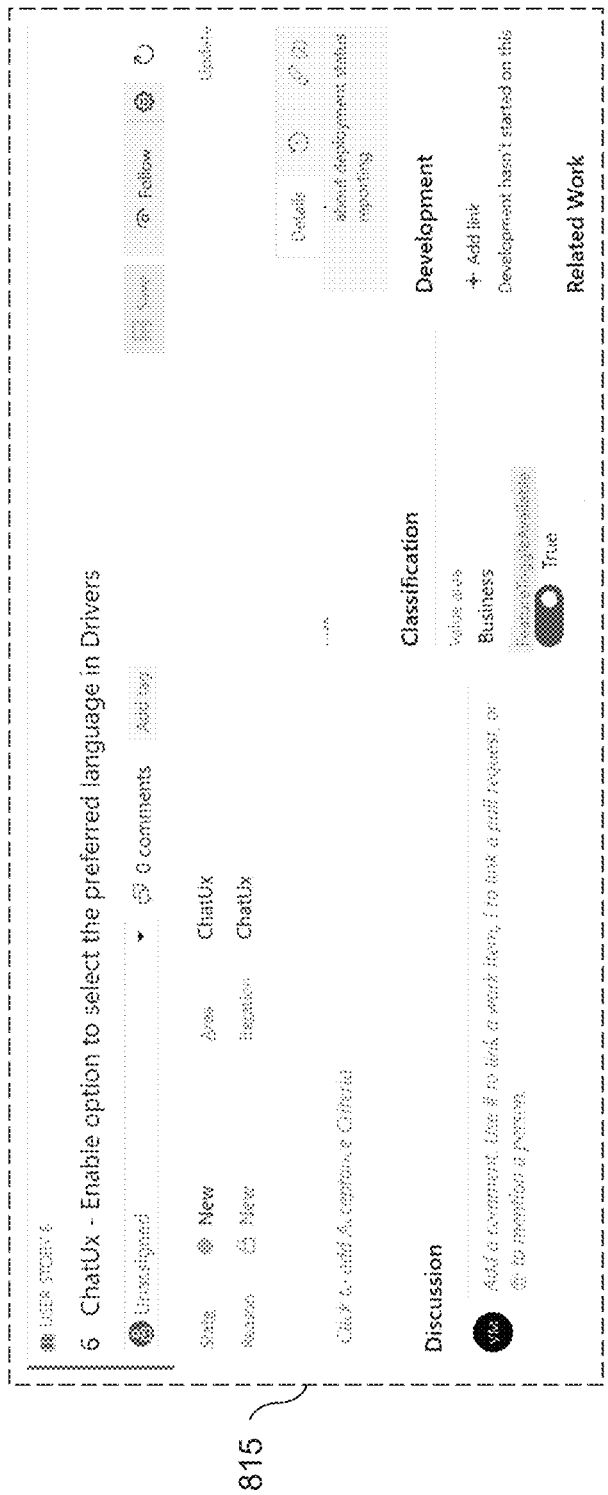

An example implementation of the process flow shown in FIGS. 7A-7C will now be described with respect to two applications, a "ChatService" application and a "ChatUX" application. The ChatService application may be implemented as a microservice, while the ChatUX application may be implemented as a user interface (UI) application. In this example, it is assumed that that ChatUX application needs to enable chat for end-users resulting in a dependency on ChatService to enable chat functionality within the ChatUX application. Further consider that there are two stories for the ChatService and ChatUX applications. The ChatService story includes a service to provide available languages. The ChatUX story includes a new feature to select a preferred language. FIG. 8A illustrates creation of stories 800 and 805 for the ChatService and ChatUX applications. FIG. 8B illustrates linking 810 the ChatUX story as dependent on the ChatService application. FIG. 8C illustrates addition of a new user defined function (UDF) field "FeatureToggleAvailable" to the ChatUX story 815. The ChatService and ChatUX stories 800 and 805 can be developed independently after the link is set up as shown in FIG. 8C.

Figure 8D:
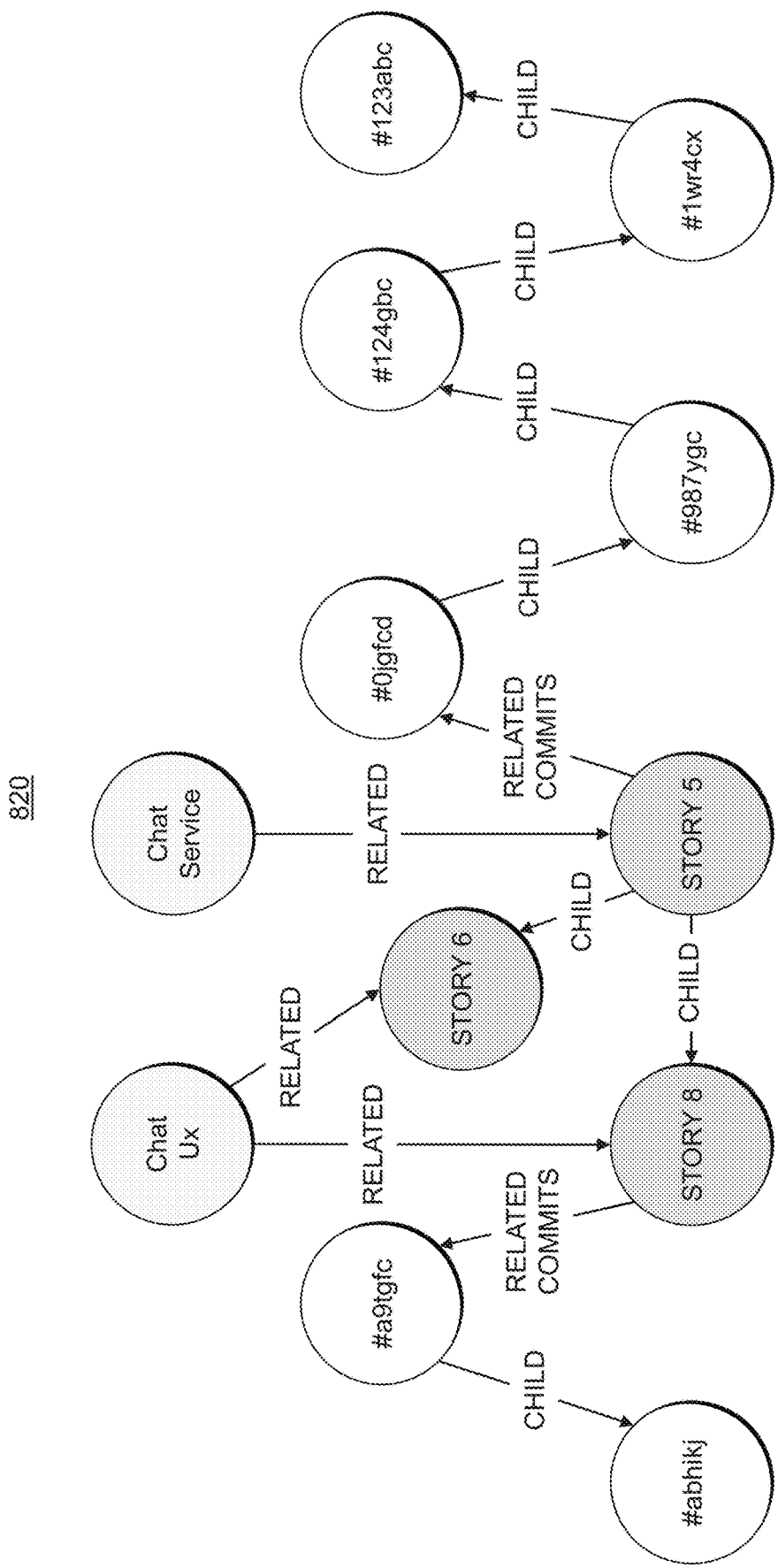
Figure 8E:
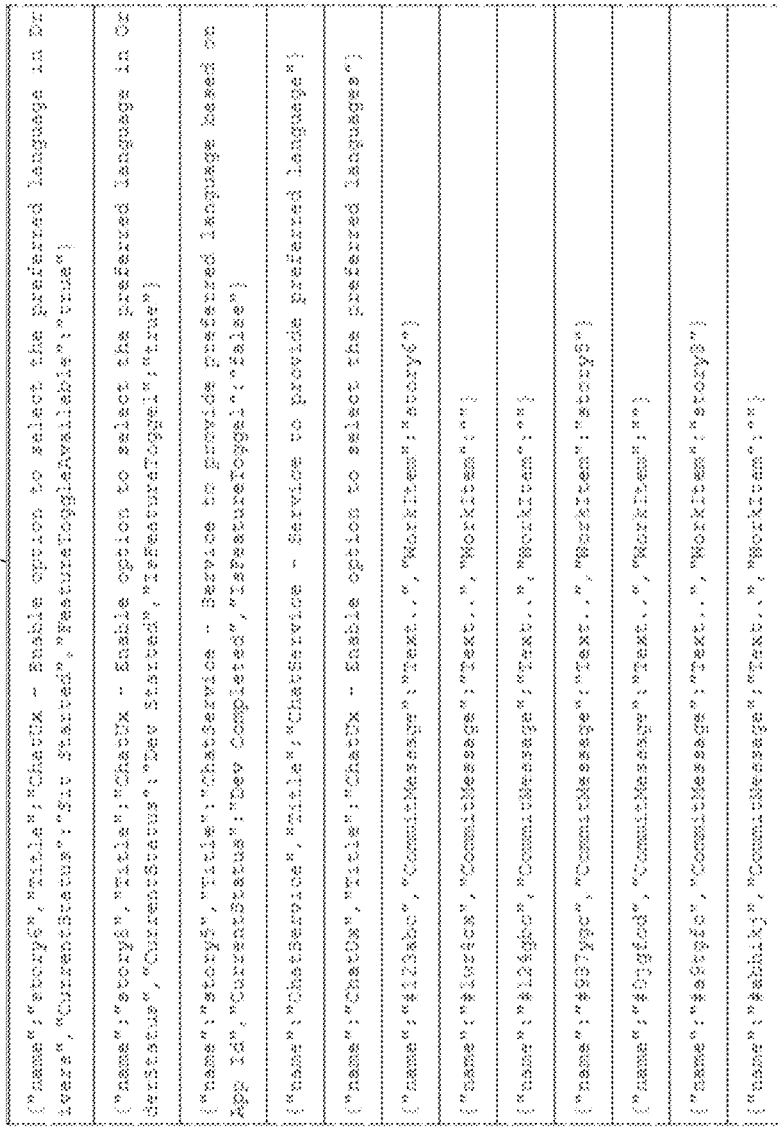
Figure 8F:
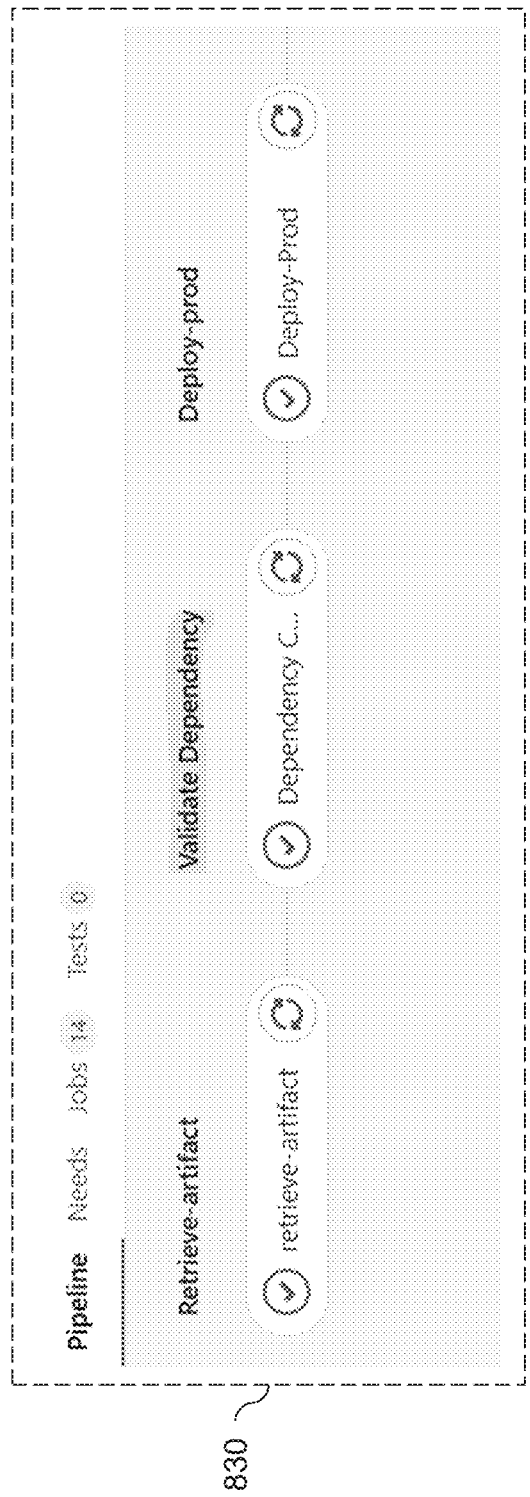

The status of work items will be derived (e.g., using the DSEF 330, which listens to source code commits and updates the work items and data source 335 as described above). The DSEF 330 can pull the work item metadata and code commit details, and store them as a dependency graph 820 (e.g., in a graph database) as shown in FIG. 8D. FIG. 8E shows sample data 825 used to build the dependency graph 820. After a successful testing cycle where the code is ready to be deployed to a production environment, there will be an additional check 830 in the CICD pipeline as shown in FIG. 8F. The evaluation process described above with respect to FIGS. 7A-7C may be performed to evaluate the status of dependent work items prior to deployment to the production environment. In this example the ChatUX application will be allowed to deploy to the production environment, but the feature toggle defined as shown in FIG. 8C will be turned off (assuming that the ChatService application is not yet deployed). If the ChatService application deploys first, then the ChatUX application would be allowed to deploy with the feature toggle enabled. As described above, if following deployment of the ChatUX application with the feature toggle disabled the ChatService application later deploys, the feature toggle in the ChatUX application may later be enabled.

Figure 8G:
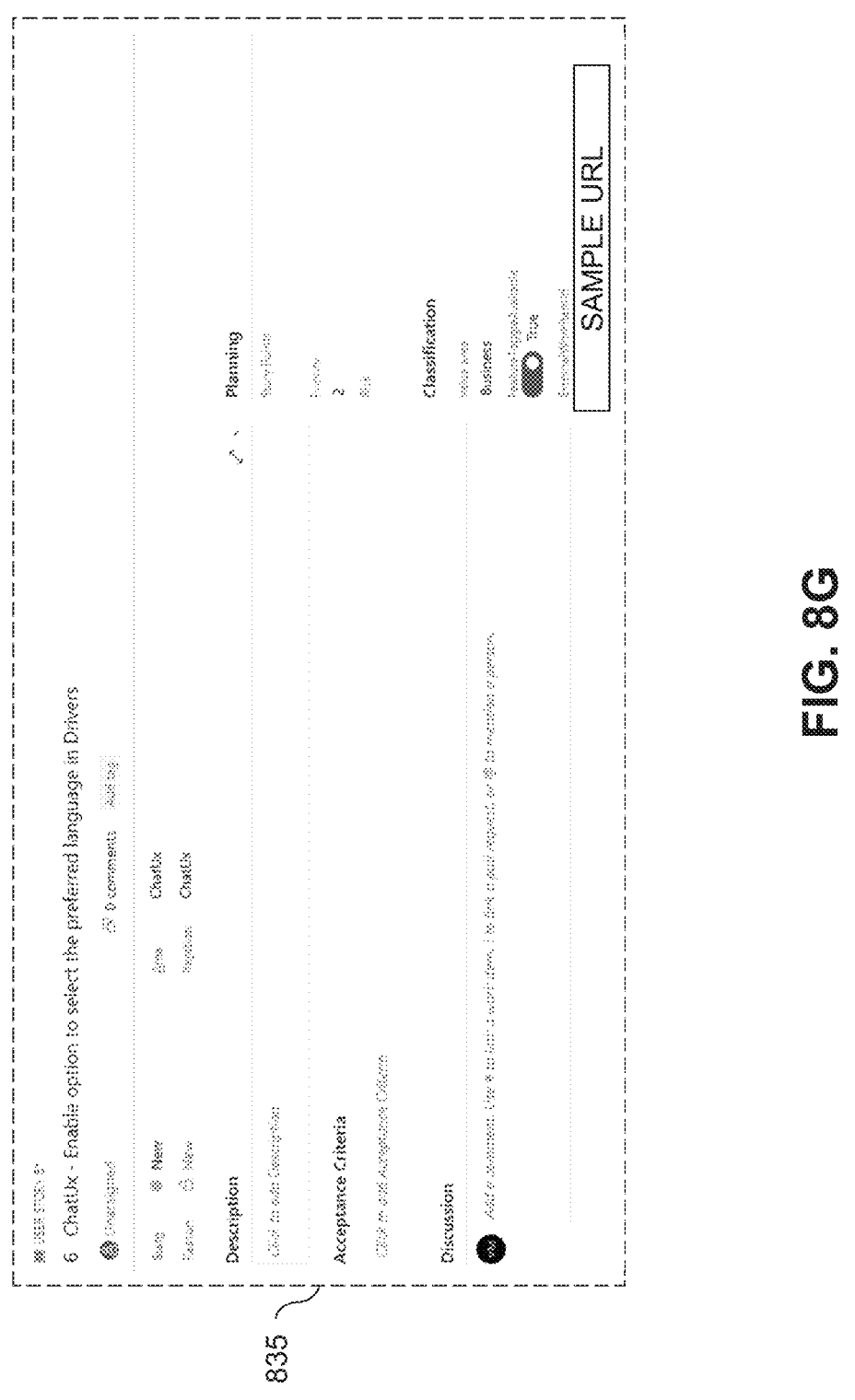
Figure 8H:
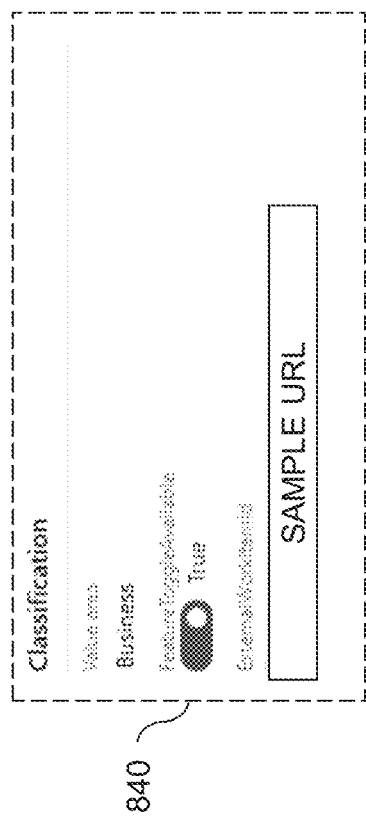

It should be noted that if dependent stories are maintained in different tracking tools, then a UDF field "ExternalWorkItemId" will capture the work item ID as shown in the views 835 and 840 of FIGS. 8G and 8H. This UDF field will later be used to build the dependency graph 820. Thus, the techniques described herein may be used in scenarios where integrations occur between organizations (e.g., from different software vendors) and/or which are tracked using different tools. The dependency system evaluation framework 330 is not restricted, and can be enabled if there is connectivity established between such organizations or tools.

Illustrative embodiments provide a number of advantages relative to conventional approaches. The frameworks described herein may be utilized by any entity that wants to leverage a dependency system as part of managing a software development lifecycle. The frameworks described herein provide a novel approach for evaluating dependency systems for applications and automatically linking work item and source code changes. Using such relations, the frameworks described herein can control production deployment and eliminate any uncertainty that might come up in production due to non-deployment of dependent systems. This provides stability in production environments, including where there are multiple changes getting deployed in enterprise applications. Further, the frameworks described herein provide a "pluggable" framework product which can be used for any source code and work item management systems. The frameworks described herein can further be leveraged in CICD systems, providing easy to track dependency systems for visualizing work progress. Further, since status updates are automated, the frameworks described herein enable real-time view of work status and manual effort on tracking work items and dependencies is reduced at every stage of software development.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for controlling deployment of software applications based on evaluating dependencies of the software applications will now be described in greater detail with reference to FIGS. 9 and 10. Although described in the context of system 100, these platforms may also be used to implement at least portions of other information processing systems in other embodiments.

Figure 9:
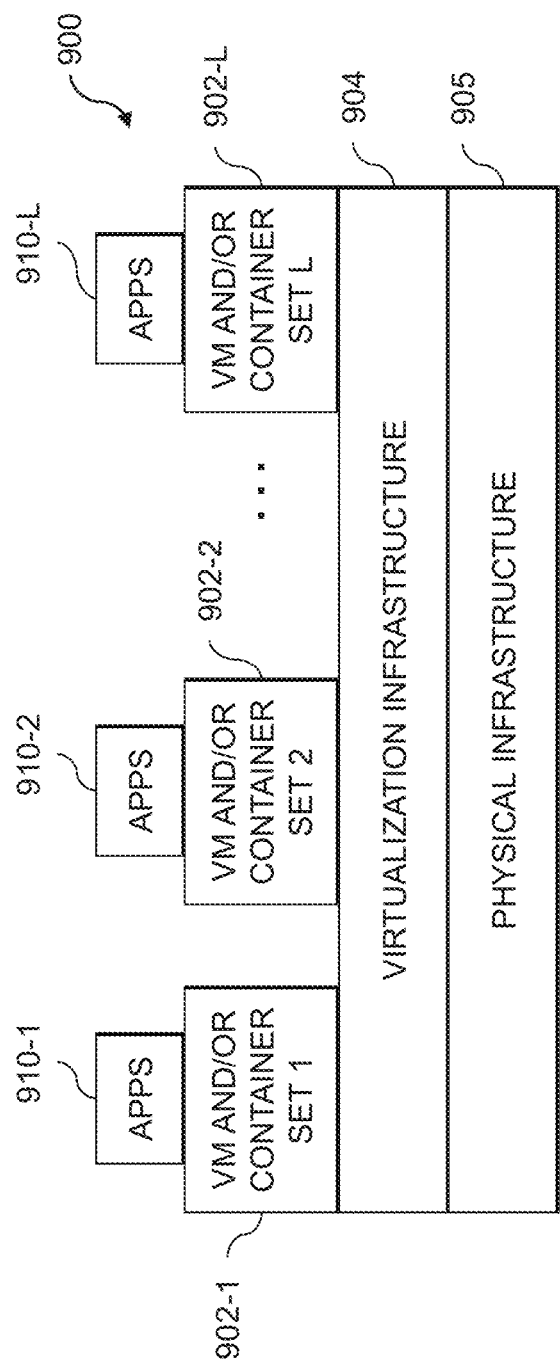

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for controlling deployment of software applications based on evaluating dependencies of the software applications as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, software support systems, software applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      monitoring development of a plurality of software applications, wherein monitoring the development of the plurality of software applications comprises tracking a plurality of work items, each of the plurality of work items being associated with development of at least one version of at least one of the plurality of software applications, and wherein tracking the plurality of work items comprises analyzing one or more source code repositories utilized by the plurality of software applications to identify a sequence of commits of software code in two or more different branches of one or more branching models utilized by the one or more source code repositories;
      identifying, based at least in part on the monitoring, a first one of the plurality of software applications that has a given version ready for deployment to a production environment of an information technology infrastructure;
      generating, based at least in part on the monitoring, in one or more data structures of the memory, a dependency graph comprising a plurality of nodes representing the plurality of work items and edges connecting the nodes representing dependency relationships between the plurality of work items, wherein a first subset of the plurality of nodes represent software code of different ones of the plurality of work items and a second subset of the plurality of nodes represent natural language descriptions of software application features of different ones of the plurality of work items;
      determining, based at least in part on processing by the processor of the one or more data structures comprising the generated dependency graph, at least one dependency between at least a first one of the plurality of work items associated with the given version of the first one of the plurality of software applications and at least a second one of the plurality of work items associated with a given version of at least a second one of the plurality of software applications, the at least one dependency being determined at least in part by identifying at least one of the edges of the dependency graph that connects (i) a given one of the nodes in the first subset of the plurality of nodes representing software code of the first work item for the given version of the first application and (ii) a given one of the nodes in the second subset of the plurality of nodes representing a natural language description of software application features of the second work item for the given version of the second application;
      evaluating a deployment status of the given version of the second one of the plurality of software applications; and
      controlling deployment of the given version of the first one of the plurality of software applications in the production environment of the information technology infrastructure based at least in part on (i) the determined dependency between the first one of the plurality of work items associated with the given version of the first one of the plurality of software applications and the second one of the plurality of work items associated with the given version of the second one of the plurality of software applications, (ii) the evaluated deployment status of the given version of the second one of the plurality of software applications and (iii) a commit status of the first and second ones of the plurality of work items;
   wherein controlling deployment of the given version of the first one of the plurality of software applications in the production environment of the information technology infrastructure comprises preventing deployment of at least a portion of one or more features of the given version of the first one of the plurality of software applications that have dependencies with the given version of the second one of the plurality of software applications.

2. The apparatus of claim 1 wherein the first one of the plurality of software applications is developed by a first software vendor and the second one of the plurality of software applications is developed by a second software vendor different than the first software vendor.

3. The apparatus of claim 1 wherein evaluating the deployment status of the given version of the second one of the plurality of software applications comprises determining whether the given version of the second one of the plurality of software applications has been deployed in the production environment of the information technology infrastructure.

4. The apparatus of claim 3 wherein controlling deployment of the given version of the first one of the plurality of software applications in the production environment of the information technology infrastructure comprises, responsive to determining that the given version of the second one of the plurality of software applications has been deployed in the production environment of the information technology infrastructure, allowing deployment of the given version of the first one of the plurality of software applications in the production environment of the information technology infrastructure.

5. The apparatus of claim 3 wherein controlling deployment of the given version of the first one of the plurality of software applications in the production environment of the information technology infrastructure comprises, responsive to determining that the given version of the second one of the plurality of software applications has not been deployed in the production environment of the information technology infrastructure, identifying the one or more features of the given version of the first one of the plurality of software applications that have dependencies with the given version of the second one of the plurality of software applications.

6. The apparatus of claim 5 wherein controlling deployment of the given version of the first one of the plurality of software applications in the production environment of the information technology infrastructure further comprises determining whether the given version of the first one of the plurality of software applications has available feature toggles for the identified one or more features.

7. The apparatus of claim 6 wherein controlling deployment of the given version of the first one of the plurality of software applications in the production environment of the information technology infrastructure further comprises, responsive to determining that the given version of the first one of the plurality of software applications has available feature toggles for the identified one or more features, utilizing the available feature toggles to disable the identified one or more features and allowing deployment of the given version of the first one of the plurality of software applications in the production environment of the information technology infrastructure with the identified one or more features disabled.

8. The apparatus of claim 7 wherein controlling deployment of the given version of the first one of the plurality of software applications in the production environment of the information technology infrastructure further comprises, responsive to determining that the given version of the second one of the plurality of software applications has been deployed in the production environment of the information technology infrastructure subsequent to deployment of the given version of the first one of the plurality of software applications in the production environment of the information technology infrastructure with the identified one or more features disabled, utilizing the available feature toggles to enable the identified one or more features.

9. The apparatus of claim 6 wherein controlling deployment of the given version of the first one of the plurality of software applications in the production environment of the information technology infrastructure further comprises, responsive to determining that the given version of the first one of the plurality of software applications does not have available feature toggles for the identified one or more features, blocking deployment of the given version of the first one of the plurality of software applications in the production environment of the information technology infrastructure.

10. The apparatus of claim 9 wherein controlling deployment of the given version of the first one of the plurality of software applications in the production environment of the information technology infrastructure further comprises, responsive to determining that the given version of the second one of the plurality of software applications has been deployed in the production environment of the information technology infrastructure subsequent to blocking the deployment of the given version of the first one of the plurality of software applications in the production environment of the information technology infrastructure, allowing deployment of the given version of the first one of the plurality of software applications in the production environment of the information technology infrastructure.

11. The apparatus of claim 1 wherein the two or more different branches of the one or more branching models utilized by the one or more source code repositories comprise at least two of a feature branch, a develop branch and a master branch.

12. The apparatus of claim 1 wherein identifying the sequence of commits of the software code in the two or more different branches of the one or more branching models utilized by the one or more source code repositories comprises identifying commits that have changes merged from at least a first one of the two or more different branches associated with a non-production environment to at least a second one of the two or more different branches associated with the production environment.

13. A computer program product comprising a non-transitory processor-readable storage medium having stored therein program code of one or more software programs, wherein the program code when executed by at least one processing device comprising a processor coupled to a memory causes the at least one processing device to perform steps of:

monitoring development of a plurality of software applications, wherein monitoring the development of the plurality of software applications comprises tracking a plurality of work items, each of the plurality of work items being associated with development of at least one version of at least one of the plurality of software applications, and wherein tracking the plurality of work items comprises analyzing one or more source code repositories utilized by the plurality of software applications to identify a sequence of commits of software code in two or more different branches of one or more branching models utilized by the one or more source code repositories;

identifying, based at least in part on the monitoring, a first one of the plurality of software applications that has a given version ready for deployment to a production environment of an information technology infrastructure;

generating, based at least in part on the monitoring, in one or more data structures of the memory, a dependency graph comprising a plurality of nodes representing the plurality of work items and edges connecting the nodes representing dependency relationships between the plurality of work items, wherein a first subset of the plurality of nodes represent software code of different ones of the plurality of work items and a second subset of the plurality of nodes represent natural language descriptions of software application features of different ones of the plurality of work items;

determining, based at least in part on processing by the processor of the one or more data structures comprising the generated dependency graph, at least one dependency between at least a first one of the plurality of work items associated with the given version of the first one of the plurality of software applications and at least a second one of the plurality of work items associated with a given version of at least a second one of the plurality of software applications, the at least one dependency being determined at least in part by identifying at least one of the edges of the dependency graph that connects (i) a given one of the nodes in the first subset of the plurality of nodes representing software code of the first work item for the given version of the first application and (ii) a given one of the nodes in the second subset of the plurality of nodes representing a natural language description of software application features of the second work item for the given version of the second application;

evaluating a deployment status of the given version of the second one of the plurality of software applications; and controlling deployment of the given version of the first one of the plurality of software applications in the production environment of the information technology infrastructure based at least in part on (i) the determined dependency between the first one of the plurality of work items associated with the given version of the first one of the plurality of software applications and the second one of the plurality of work items associated with the given version of the second one of the plurality of software applications, (ii) the evaluated deployment status of the given version of the second one of the plurality of software applications and (iii) a commit status of the first and second ones of the plurality of work items;

wherein controlling deployment of the given version of the first one of the plurality of software applications in the production environment of the information technology infrastructure comprises preventing deployment of at least a portion of one or more features of the given version of the first one of the plurality of software applications that have dependencies with the given version of the second one of the plurality of software applications.

14. The computer program product of claim 13 wherein evaluating the deployment status of the given version of the second one of the plurality of software applications comprises determining whether the given version of the second one of the plurality of software applications has been deployed in the production environment of the information technology infrastructure, and wherein controlling deployment of the given version of the first one of the plurality of software applications in the production environment of the information technology infrastructure comprises, responsive to determining that the given version of the second one of the plurality of software applications has not been deployed in the production environment of the information technology infrastructure:

identifying the one or more features of the given version of the first one of the plurality of software applications that have dependencies with the given version of the second one of the plurality of software applications; and determining whether the given version of the first one of the plurality of software applications has available feature toggles for the identified one or more features.

15. The computer program product of claim 14 wherein controlling deployment of the given version of the first one of the plurality of software applications in the production environment of the information technology infrastructure further comprises:

responsive to determining that the given version of the first one of the plurality of software applications has available feature toggles for the identified one or more features, utilizing the available feature toggles to disable the identified one or more features and allowing deployment of the given version of the first one of the plurality of software applications in the production environment of the information technology infrastructure with the identified one or more features disabled; and responsive to determining that the given version of the first one of the plurality of software applications does not have available feature toggles for the identified one or more features, blocking deployment of the given version of the first one of the plurality of software applications in the production environment of the information technology infrastructure.

16. A method performed by at least one processing device comprising a processor coupled to a memory, the method comprising:

monitoring development of a plurality of software applications, wherein monitoring the development of the plurality of software applications comprises tracking a plurality of work items, each of the plurality of work items being associated with development of at least one version of at least one of the plurality of software applications, and wherein tracking the plurality of work items comprises analyzing one or more source code repositories utilized by the plurality of software applications to identify a sequence of commits of software code in two or more different branches of one or more branching models utilized by the one or more source code repositories;

identifying, based at least in part on the monitoring, a first one of the plurality of software applications that has a given version ready for deployment to a production environment of an information technology infrastructure;

generating, based at least in part on the monitoring, in one or more data structures of the memory, a dependency graph comprising a plurality of nodes representing the plurality of work items and edges connecting the nodes representing dependency relationships between the plurality of work items, wherein a first subset of the plurality of nodes represent software code of different ones of the plurality of work items and a second subset of the plurality of nodes represent natural language descriptions of software application features of different ones of the plurality of work items;

determining, based at least in part on processing by the processor of the one or more data structures comprising the generated dependency graph, at least one dependency between at least a first one of the plurality of work items associated with the given version of the first one of the plurality of software applications and at least a second one of the plurality of work items associated with a given version of at least a second one of the plurality of software applications, the at least one dependency being determined at least in part by identifying at least one of the edges of the dependency graph that connects (i) a given one of the nodes in the first subset of the plurality of nodes representing software code of the first work item for the given version of the first application and (ii) a given one of the nodes in the second subset of the plurality of nodes representing a natural language description of software application features of the second work item for the given version of the second application;

evaluating a deployment status of the given version of the second one of the plurality of software applications; and controlling deployment of the given version of the first one of the plurality of software applications in the production environment of the information technology infrastructure based at least in part on (i) the determined dependency between the first one of the plurality of work items associated with the given version of the first one of the plurality of software applications and the second one of the plurality of work items associated with the given version of the second one of the plurality of software applications, (ii) the evaluated deployment status of the given version of the second one of the plurality of software applications and (iii) a commit status of the first and second ones of the plurality of work items;

wherein controlling deployment of the given version of the first one of the plurality of software applications in the production environment of the information technology infrastructure comprises preventing deployment of at least a portion of one or more features of the given version of the first one of the plurality of software applications that have dependencies with the given version of the second one of the plurality of software applications.

17. The method of claim 16 wherein evaluating the deployment status of the given version of the second one of the plurality of software applications comprises determining whether the given version of the second one of the plurality of software applications has been deployed in the production environment of the information technology infrastructure, and wherein controlling deployment of the given version of the first one of the plurality of software applications in the production environment of the information technology infrastructure comprises, responsive to determining that the given version of the second one of the plurality of software applications has not been deployed in the production environment of the information technology infrastructure:

identifying the one or more features of the given version of the first one of the plurality of software applications that have dependencies with the given version of the second one of the plurality of software applications; and determining whether the given version of the first one of the plurality of software applications has available feature toggles for the identified one or more features.

18. The method of claim 17 wherein controlling deployment of the given version of the first one of the plurality of software applications in the production environment of the information technology infrastructure further comprises:

responsive to determining that the given version of the first one of the plurality of software applications has available feature toggles for the identified one or more features, utilizing the available feature toggles to disable the identified one or more features and allowing deployment of the given version of the first one of the plurality of software applications in the production environment of the information technology infrastructure with the identified one or more features disabled; and responsive to determining that the given version of the first one of the plurality of software applications does not have available feature toggles for the identified one or more features, blocking deployment of the given version of the first one of the plurality of software applications in the production environment of the information technology infrastructure.

19. The method of claim 16 wherein the two or more different branches of the one or more branching models utilized by the one or more source code repositories comprise at least two of a feature branch, a develop branch and a master branch.

20. The method of claim 16 wherein identifying the sequence of commits of the software code in the two or more different branches of the one or more branching models utilized by the one or more source code repositories comprises identifying commits that have changes merged from at least a first one of the two or more different branches associated with a non-production environment to at least a second one of the two or more different branches associated with the production environment.

* * * * *